(12) United States Patent
Meisenheimer et al.

(10) Patent No.: US 10,824,667 B2
(45) Date of Patent: Nov. 3, 2020

(54) SYSTEMS AND METHODS FOR RECOMMENDING MEDIA ASSETS BASED ON OBJECTS CAPTURED IN VISUAL ASSETS

(71) Applicant: Rovi Guides, Inc., San Jose, CA (US)

(72) Inventors: Brian Lee Meisenheimer, Valley Glen, CA (US); China Arai, Valley Glen, CA (US)

(73) Assignee: Rovi Guides, Inc., San Jose, CA (US)

( * ) Notice: Subject to any disclaimer, the term of this patent is extended or adjusted under 35 U.S.C. 154(b) by 307 days.

(21) Appl. No.: 16/023,919

(22) Filed: Jun. 29, 2018

(65) Prior Publication Data

US 2020/0004830 A1    Jan. 2, 2020

(51) Int. Cl.
| | |
|---|---|
| G06F 16/487 | (2019.01) |
| H04W 4/029 | (2018.01) |
| G06T 7/70 | (2017.01) |
| G06F 3/0482 | (2013.01) |
| G06F 3/0484 | (2013.01) |
| G06F 16/29 | (2019.01) |
| G06F 16/435 | (2019.01) |
| G06F 16/9535 | (2019.01) |
| G06F 16/2457 | (2019.01) |
| G01S 19/42 | (2010.01) |
| H04W 4/02 | (2018.01) |

(52) U.S. Cl.
CPC .......... *G06F 16/487* (2019.01); *G06F 3/0482* (2013.01); *G06F 3/0484* (2013.01); *G06F 16/24578* (2019.01); *G06F 16/29* (2019.01); *G06F 16/435* (2019.01); *G06F 16/9535* (2019.01); *G06T 7/70* (2017.01); *H04W 4/029* (2018.02); *G01S 19/42* (2013.01); *H04W 4/023* (2013.01)

(58) Field of Classification Search
CPC ............. G06F 116/487; G06F 116/435; G06F 116/24578; G06F 116/29; G06F 116/9535; G06T 7/70; H04W 4/029
See application file for complete search history.

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,135,505 B2 * | 3/2012 | Vengroff | H04L 67/18 701/24 |
| 9,178,933 B1 * | 11/2015 | Soland | H04L 67/306 |
| 9,418,482 B1 * | 8/2016 | Yang | G06T 19/006 |
| 2002/0174430 A1 | 11/2002 | Ellis et al. | |

(Continued)

*Primary Examiner* — Apu M Mofiz
*Assistant Examiner* — Giao Truong
(74) *Attorney, Agent, or Firm* — Haley Guiliano LLP

(57) ABSTRACT

Systems and methods are disclosed for recommending media assets based on objects captured in visual assets. A location of a visual asset is determined, where the location is associated with the visual asset. A location score is determined based on one or more of: a user travel score, a user travel frequency score, and a popularity score. A determination is made whether the location score exceeds a threshold. Responsive to a determination that the location score exceeds the threshold, the system detects an object within the visual asset and generates a recommendation of a media asset that is associated with the object.

20 Claims, 17 Drawing Sheets

(56) References Cited

U.S. PATENT DOCUMENTS

2005/0251827 A1   11/2005   Ellis et al.
2012/0323930 A1*  12/2012   Kennberg ............. H04L 63/101
                                                707/748

* cited by examiner

SYSTEMS AND METHODS FOR RECOMMENDING MEDIA ASSETS BASED ON OBJECTS CAPTURED IN VISUAL ASSETS

BACKGROUND

Users desire to consume media that they find enjoyable. A pervasive problem faced by those users is finding media that they currently desire to consume because the sheer volume of media available to those users is enormous. Current systems are able to recommend media to users to solve that problem. Various systems use different methods and algorithms to recommend media. For example, some systems are able to track users' viewing habits, and based on those viewing habits give recommendations. Other systems identify media that is popular and recommend that media to users. Some systems even enable to recommend media content based on a media that the user has created (e.g., a photo the user has taken). However, those systems are unable to determine whether the user desires a recommendation based on the created media or whether the user is just taking the picture as a usual event.

SUMMARY

Therefore, systems and methods are disclosed herein for enabling recommending media assets based on objects captured in visual assets. This technique allows for a media guidance application to be configured to determine a location score of the visual asset, and if the score exceeds a threshold: detecting an object within the visual asset, and generating a recommendation of the media asset associated with the object. For example, if the user takes a picture with their electronic user device (e.g., smartphone with embedded camera), the user may or may not be interested in the subject matter of the picture taken. If the picture was taken on a mundane walk to work which is a usual occurrence for the user, it is likely not interesting. However, if the user is on vacation and takes a picture of a popular landmark, it is likely that the user is interested in the subject matter of the picture. Users generally capture pictures of sites they are interested in and thus recommendations of media assets which coincide with their interests would be desirable.

To determine a location score, present techniques disclose evaluating the location of the object in order to omit objects of non-interest to the user. For example, a user walks to work every day and sees the same statue on the route to work. If the user takes a picture of this statue, it is likely that this is not of interest, as the user observes this landmark daily, the frequency of the user seeing this landmark is daily, and according to various social metrics, the landmark is not very popular. Thus, given that the landmark is not of interest to the user, the media guidance application may not make any media recommendations based on this location. Instead, the presently disclosed techniques allow for only objects of interests within visual assets to be used for media asset recommendations to the user.

A user may wish to receive media asset recommendations of where the user takes a picture using their electronic user device at a point of interest to the user. For example, a user may live in San Francisco and live in the Dogpatch neighborhood and work downtown in the Financial District. However, on the weekend the user wishes to hike to the top of the Marin Headlands across the Golden Gate bridge and take a picture from the top of the point of highest elevation. This is of particular interest to the user as the user does not see this vista on a normal work day, as the normal locational pattern is between Dogpatch and Financial Distinct, not Marin Headlands which is 10 miles away from the user's neighborhood. Thus, in this scenario, the system would determine that the user is interested in a media recommendation associated with the Golden Gate bridge.

In some aspects, a media guidance application may receive a visual asset (e.g., a photograph) captured by a user's smartphone. The media guidance application may determine the location associated with the visual asset. In this case, the picture may contain embedded locational metadata which provides information to the media guidance application that the picture was taken at a particular set of Global Positioning System ("GPS") coordinates. The media guidance application may determine a location score for the particular location in the Marin Headlands where the user took the picture. In this example, the locational score will use solely the user travel score associated with the location as determination for the location score. The media guidance application may retrieve a plurality of locations that the user has visited. For example, the user works in the Financial Distinct in San Francisco and resides in the Dogpatch neighborhood (e.g., home location). The media guidance application may calculate distances between the user's home location and each of the locations the user has visited. In this example, the media guidance application may calculate that the user travels three miles to work, and travels eleven miles to the peak in Marin Headlands where this picture was taken. The media guidance application may calculate a user travel radius based on the plurality of distances. In this example, the user made five journeys to and from work, while only 1 journey to Marin Headlands to take the picture. The media guidance application, in this example, may calculate that the user travel radius is 4.3 miles. The media guidance application may compare the distance traveled for the location to the user travel radius. Here, the media guidance application may compare the calculated 4.3 miles (i.e., the user travel radius) with the eleven mile distance from the user's home in Dogpatch to the Financial District in San Francisco.

The media guidance application may generate a user travel score based on the difference between the user travel radius and the travel distance. Here, the media guidance application may create a value based on the difference being greater than two times the user travel radius. The media guidance application, in this example, may determine the locational score based solely on the user travel score associated with the location. Here, the media guidance application may create a separate value for the locational score based on the user travel score; because the sole factor used was the user travel score, in this scenario the location score is equivalent to the user travel score. The media guidance application may determine whether the location score exceeds a threshold. In this example, the media guidance application may retrieve a threshold from a database and compare the location score with the retrieved threshold value.

In response to the media guidance application determining that the location score exceeds the threshold, the media guidance application may detect an object within the visual asset. In this example, the media guidance application may determine through value analysis that the location score exceeds the threshold. The media guidance application may determine within the visual asset (e.g., the picture taken at the Marin Headlands), that the Golden Gate Bridge is in the background of the picture. The media guidance application may generate one or more recommendation of media assets associated with the object to the user. In this example, because the detected object was the Golden Gate Bridge, the generated recommendations of the media assets include scenes including the Golden Gate Bridge and recommend: San Andreas (2015), The Rock (1996), and Rise of the Planet of the Apes (2011).

The media guidance application may perform the following actions to enable determining whether to recommend media assets based on objects captured in visual assets. The media guidance application may receive pictures captured by a user's electronic device. Specifically, the media guidance application may retrieve a visual asset captured by a user device. For example, the media guidance application may receive a picture of the Golden Gate Bridge from the user's mobile phone with embedded camera.

The media guidance application may determine where the picture was taken (i.e., where the visual asset was created). Specifically, the media guidance application may determine a location associated with the visual asset. Continuing with the previous example, the picture on the user's mobile phone may have embedded metadata which contains the Global Positioning System (GPS) coordinates of where the picture was taken. The media guidance application may extract that information from the metadata.

The media guidance application may determine whether the location of the picture is deemed relevant by using a score. Specifically, the media guidance application may determine a location score for the location based on one or more of: a user travel score associated with the location, a user frequency score associated with the location, and a popularity score association with the location. Continuing with the previous example, the picture of the Golden Gate Bridge on the user's mobile phone taken from the location of the Marin Headlands may be scored based on at least one of a number of techniques based on a travel distance, travel frequency, and popularity of the location.

The media guidance application may determine a travel score by measuring the distances for a number of locations the user has visited. Specifically, the media guidance application may determine a user travel score associated with the location by retrieving a plurality of locations that the user has visited. Continuing with the previous example, the user ventured to the Marin Headlands. This location of the Marin Headlands may be retrieved by the media guidance application to evaluate the user travel score. Additionally, other locations visited by the user may also be retrieved by the media guidance application (e.g., the user's work location, the user's local gym, etc.).

The media guidance application may calculate the distances from the home location of the user to multiple locations that the user has visited. Specifically, the media guidance application may calculate, for the plurality of locations, a plurality of distances each distance between the user's home location and the respective location that the user has visited. Continuing from the previous example, the media guidance application may calculate the distance from the user's home residence in Dogpatch to Marin Headlands (eleven miles), the user's home residence to the user's work in the Financial District (3.5 miles), and the user's home residence to the user's gym (3.1 miles).

The media guidance application may determine a user travel radius based on the previous distance calculations. Specifically, the media guidance application may determine, based on the plurality of distances, a user travel radius. Continuing from the previous example, a travel radius may be determined by averaging all the distances resulting in a travel radius of approximately 5.8 miles.

The media guidance application may calculate the distance between the user's residence and the location where the user took the picture. Specifically, the media guidance application may calculate a travel distance between the user's home location and the location associated with the visual asset. Continuing from the previous example, the media guidance application may calculate the distance between the user's residence in Dogpatch and the Marin Headlands where the user took the picture of the Golden Gate Bridge which is eleven miles.

The media guidance application may compare the distance between the user's residence and where the picture was taken with the travel radius value. Specifically, the media guidance application may compare the user travel radius with the travel distance. Continuing from the previous example, the media guidance application may compare the eleven mile value (distance between user's residence and Marin Headlands) to the travel radius of 5.8 miles.

The media guidance application may create a travel score based on the comparison above. Specifically, the media guidance application may generate the user travel score for the location based on the difference in the user travel radius and the travel distance. Continuing from the previous example, the score may be a value of the ratio between the two numbers and the 1.89 weighing the distance from the user's residence to the Marin Headlands relative to the calculated user radius.

The media guidance application may determine a score based on the number of times the user visits a location. Specifically, the media guidance application may determine a user travel frequency score associated with the location by determining a number of times the user has visited the location during the current time period. Continuing from the previous example, the media guidance application may determine how many times the user has visited the Marin Headlands. In this example, the user has never visited the Marin Headlands prior to taking the picture of the Golden Gate Bridge.

The media guidance application may determine if the number of times the user has visited the location is greater than a predetermined value for the number of visits. Specifically, the media guidance application may determine whether the number of times the user has visited the location during the current time period exceeds a number of times the user has visited the location during a previous time period, by a first given amount. Continuing from the previous example, the user's number of visits (e.g., 1) may be compared with a previous time period (e.g., 0). Thus, in this case, the user's visit exceeds the number of visits the user had done previously.

The media guidance application may determine a frequency score based on the number of times the user has visited the location that they took the picture relative to the number of visits the user made to the same location at a different time period. Specifically, the media guidance application may in response to a determination that the number of times the user has visited the location during the current time period exceeds the number of times the user has visited the location during the previous time period, by the first given amount, calculate the user travel frequency score for the location based on a difference value by which the number of times the user visited the location for the current time period exceeded the number of times the user visited the location for the previous time period. Continuing from the previous example, the score may be 100 as the ratio between the number of visits to the location relative to previous visits is (1:0).

The media guidance application may determine how popular a location is based on the amount of social media asset that's generated for the location for a recent time period. Specifically, the media guidance application may determine a popularity score associated with the location determined by calculating an amount of metadata created in association with the location for the current time period. Continuing from the previous example, the media guidance application may determine that the user is at the Marin Headlands and may search an image based social media network to determine how many social media posts have been posted within the last 24 hours for the Marin Headlands.

The media guidance application may track the social media network by comparing the amount of social media created for the location for a current time period with an amount of social media created during a previous time period. Specifically, the media guidance application may determine whether the amount of metadata created in association with the location for the current time period exceeds an amount of metadata created in association with the location for the previous time period by a second given amount. Continuing from the previous example, the media guidance application may determine that the amount of posts for the Marin Headlands in the last 24 hours exceeds the previous 5 days by a factor of at least four times more content relative to each of the past four days.

The media guidance application may create a score based on the difference between the amount of social network content created for the current period relative to a previous period. Specifically, the media guidance application may in response to a determination that the amount of metadata created in association with the location for the current time period exceeds the amount of metadata created in association with the location for the previous time period by the second given amount, calculate the popularity score for the location based on a popularity value by which the amount of metadata created in association with the location for the current time period exceeds the amount of metadata created in association with the location for the previous time period. Continuing from the previous example, the score may be "4" as the amount of posts for the Marin Headlands in the last 24 hours exceeds the previous 5 days by a factor of at least four times more content relative to each of the past four days.

The media guidance application may determine whether the location score (e.g., determined from at least one of the travel score, frequency score, and popularity score) is greater than a predetermined threshold value. Specifically, the media guidance application may determine whether the location score exceeds a threshold. Continuing from the previous example, the location score generated from at least one of the travel score, frequency score, and popularity score may be compared with a predetermined value.

The media guidance application may detect an object within the picture taken from the user's device. Specifically, the media guidance application may in response to a determination that the location score exceeds the threshold, detect an object within the visual asset. Continuing from the previous example, the picture taken by the user's mobile phone at the Marin Headlands is analyzed and is determined that the Golden Gate Bridge is an object within the picture taken.

The media guidance application may provide media asset recommendations to the user based on the objects within the picture captured by the user. Specifically, the media guidance application may generate a recommendation of a media asset that is associated with the object. Continuing from the previous example, because the detected object was the Golden Gate Bridge, the generated recommendations of the media assets include scenes including the Golden Gate Bridge and recommend: San Andreas (2015), The Rock (1996), and Rise of the Planet of the Apes (2011) which all contain scenes of the Golden Gate Bridge and are set in San Francisco.

In some embodiments, the media guidance application may detect an object within the picture taken by the user. Specifically, the media guidance application may detect an object within the visual asset. Continuing from the previous example, media guidance application may detect that the Golden Gate Bridge is an object within the picture taken.

The media guidance application may compare the detected object with known objects (e.g., perhaps by comparison with known objects in a database). Specifically, the media guidance application may compare the object within the visual asset with each of a plurality of known objects. Continuing from the previous example, a textual/visual representation of the object associated with the Golden Gate Bridge may be compared with the textual representation and/or visual representation of the Golden Gate Bridge in a database which stores known objects.

The media guidance application may determine a match based on the previous comparison of the determined object to known objects in the database. Specifically, the media guidance application may determine, based on comparing the object within the visual asset with each of the plurality of known objects, whether the object within the visual asset matches a known object within the plurality of known objects. Continuing from the previous example, the Golden Gate Bridge identified in the picture is confirmed as a known object based on comparison with known objects in the database.

The media guidance application may retrieve the locational data associated with the known object as it matches the object in the picture taken by the user. Specifically, the media guidance application may in response to determination that the object within the visual asset matches the known object within the plurality of known objects. Continuing from the previous example, the locational coordinates of the Golden Gate Bridge are retrieved from the database.

The media guidance application may assign the locational data from the known object to the object from the picture taken by the user. Specifically, the media guidance application may assign the locational coordinates to the visual asset. Continuing from the previous example, the Golden Gate Bridge will be assigned the locational coordinated of the known object from the database (which is also the Golden Gate Bridge as it matched earlier).

The media guidance application may obtain GPS coordinates of the picture taken by accessing the metadata of the picture. Specifically, the media guidance application may retrieve, from metadata associated with the visual asset, GPS coordinates for the visual asset. Continuing from the previous example, the GPS coordinates of the Golden Gate Bridge may be obtained from the metadata of the picture that is stored on the user's smart phone.

The media guidance application may compare the retrieved GPS coordinates with a GPS coordinates of known locations. Specifically, the media guidance application may compare the GPS coordinates of the visual asset with a plurality of sets of GPS coordinates, wherein each set of GPS coordinates of the plurality of sets of coordinates is associated with a location. Continuing from the previous example, the GPS coordinates of the Golden Gate Bridge are compared to a number of other GPS coordinates that are associated with different locations (e.g., Yosemite national Park, Santa Cruz Beach, Palace of Fine Arts, etc.).

The media guidance application may determine whether the retrieved GPS coordinates match any of the number of other GPS coordinates. Specifically, the media guidance application may determine, based comparing the GPS coordinates of the visual asset with the plurality of sets of GPS coordinates, whether the GPS coordinates of the visual asset match a set of the plurality of sets of the GPS coordinates. Continuing from the previous example, the media guidance application may determine whether the GPS coordinates of the Golden Gate Bridge match a number of other GPS coordinates.

The media guidance application may retrieve a location identifier upon matching the GPS coordinates which matched the GPS coordinates of the picture taken by the user's device. Specifically, the media guidance application may in response to a determination that the GPS coordinates of the visual asset match the set of the plurality of sets of the GPS coordinates, retrieve a location identifier associated with the set of the plurality of sets of the GPS coordinates. Continuing from the previous example, a locational identifier (e.g., specific for a social network) may be retrieved from the matching set of GPS coordinates to the GPS coordinates of the Golden Gate Bridge. In this way, the locational identifier may be for the "Golden Gate Bridge" as it's represented on the specific social network.

The media guidance application may retrieve a locational identifier from the metadata within the picture taken by the user's mobile phone. Specifically, the media guidance application may retrieve a locational identifier of the visual asset from metadata associated with the visual asset. Continuing from the previous example, the user took a picture from the Marin Headlands and the media guidance application may retrieve the locational identifier of "Marin Headlands" from the locational metadata within the picture.

The media guidance application may use the locational identifier to search a social network for other content using this identifier. Specifically, the media guidance application may search a social network for the locational identifier of the visual asset. Continuing from the previous example, the media guidance application may search a social network using the identifier "Marin Headlands".

The media guidance application may use the locational identifier to determine the number of posts a social network that use the locational identifier. Specifically, the media guidance application may determine the number of content posts associated with the locational identifier on the social network for the current time period. Continuing from the previous example, the media guidance application may determine that there are 50,000 posts on the social network using the identifier "Marin Headlands".

The media guidance application may retrieve a locational identifier from the metadata within the picture taken by the user's mobile phone. Specifically, the media guidance application may retrieve a locational identifier of the visual asset from metadata associated with the visual asset. Continuing from the previous example, the user took a picture from the Marin Headlands and the media guidance application may retrieve the locational identifier of "Marin Headlands" from the locational metadata within the picture.

The media guidance application may search the Internet using the locational identifier for content associated with the locational identifier. Specifically, the media guidance application may search the Internet, using the locational identifier, for data associated with the locational identifier. Continuing from the previous example, the media guidance application may search the Internet for "Marin Headlands" (e.g., in word, image, audio, or other relevant format).

The media guidance application may determine the amount of content created on the Internet using the locational identifier. Specifically, the media guidance application may determine the number of Internet locations associated with the locational identifier that have been created during the current time period. Continuing from the previous example, the media guidance application may determine that there are 30,000 pieces of content on the Internet for "Marin Headlands."

The media guidance application may retrieve a start and end date for a specific time period. Specifically, the media guidance application may retrieve a start date and an end date for the current time period. Continuing from the previous example, the media guidance application may retrieve a start date as the day before the picture as taken and the end date at the point the picture was taken.

The media guidance application may search the Internet websites for the date of creation of the website based on the locational identifier. Specifically, the media guidance application may search a first Internet location for a creation timestamp. Continuing from the previous example, the media guidance application may search and find a website associated with the locational identifier of "Marin Headlands" and finds a timestamp of 8 hours before the picture was taken.

The media guidance application may compare the Internet website creation date with the start and end date. Specifically, the media guidance application may compare the creation timestamp with the start date and the end date. Continuing from the previous example, the timestamp of the website was 8 hours before the picture was taken.

The media guidance application may create a list of websites which are created within the time period based on the locational identifier. Specifically, the media guidance application may in response to a determination that the creation timestamp is between the start date and the end date, add the first location to a list of locations that have been created during the current time period. Continuing from the previous example, this website is added to the list as it was created within 8 hours of the picture being taken at the Marin Headlands.

The media guidance application may, within the picture captured by the user's device, detect a number of objects. Specifically, the media guidance application may detect a plurality of objects within the visual asset. Continuing from the previous example, the picture taken of the Golden Gate Bridge may also capture Coit Tower in San Francisco.

The media guidance application may send a prompt notification to the user's device of all the objects detected in the picture taken. Specifically, the media guidance application may generate for display to the user an indication of each object of the plurality of objects with a prompt to select and object of interest. Continuing from the previous example, the user's mobile phone would receive a prompt notification which lists the Golden Gate Bridge and Coit Tower.

The media guidance application may receive a selection of objects on the user's device after the prompt is given. Specifically, the media guidance application may receive, from the user, a selection of an object of the plurality of objects. Continuing from the previous example, the user may select both Coit Tower and the Golden Gate Bridge as a selection from the prompt.

The media guidance application may, based on the selections made by the user, indicate that those objects are of interest to the user. Specifically, the media guidance application may mark the selected object as an object of interest. Continuing from the previous example, both Coit Tower and the Golden Gate Bridge are of interest to the user.

The media guidance application may search a user's mobile phone for preexisting pictures. Specifically, the media guidance application may search a user device for preexisting visual assets. Continuing from the previous example, the user's mobile phone may be searched for preexisting pictures.

The media guidance application may, within the preexisting picture, determine objects. Specifically, the media guidance application may detect objects within the preexisting visual assets. Continuing from the previous example, the media guidance application may determine, from user's previous photos, that there is a picture of Coit Tower.

The media guidance application may compare the objects within the picture taken to the objects from preexisting pictures. Specifically, the media guidance application may compare each of the plurality of objects with detected objects within the preexisting visual assets. Continuing from the previous example, the objects of the picture taken include the Golden Gate Bridge and Coit Tower, while an object from a preexisting picture includes Coit Tower.

The media guidance application may prevent any prompt or further action for objects which have been shot before based on the user's previous preexisting pictures. Specifically, the media guidance application may refrain from generating for display any indications for each of the plurality of objects that match any of the detected objects within the preexisting visual assets. Continuing from the previous example, because Coit Tower previously existed and currently exists in the captured photo, no indications for Coit Tower will be generated for the user as this is likely not of interest given that the user has already seen/experienced this landmark.

The media guidance application may check whether a determined object matches an object that has been marked for exclusion. Specifically, the media guidance application may determine whether any objects of the detected plurality of objects match an object that has been marked for exclusion. Continuing from the previous example, if the object is Coit Tower, the media guidance application may check whether Coit Tower has been marked for exclusion. In this scenario, Coit Tower has not been marked for exclusion.

The media guidance application may, upon matching, stop generating indications of the object for the user. Specifically, the media guidance application may in response to a determination that one or more of the detected plurality of objects match an object marked for exclusion, refrain from generating for display any indications for each of the one or more of the detected plurality of objects. Continuing from the previous example, future indications for Coit Tower would be shown as detected objects.

The media guidance application may receive a user command to delete an old picture on their mobile device. Specifically, the media guidance application may receive a command to delete a preexisting visual asset. Continuing from the previous example, the user may receive a command to delete an old picture of Coit Tower.

The media guidance application may determine all the objects within the picture. Specifically, the media guidance application may determine one or more objects within the preexisting visual asset. Continuing from the previous example, the picture of Coit Tower may have other objects. However, in this specific example, Coit Tower is the only object in the photo as the rest of the photo is black sky.

The media guidance application may send a prompt notification to the user to confirm whether they wish to add these objects to an object exclusion list. Specifically, the media guidance application may generate for display a prompt to add the one or more objects within the preexisting visual asset to an object exclusion list. Continuing from the previous example, the user would get a prompt asking whether they wish to place Coit Tower on the object exclusion list, as the media guidance application may assume the user may not be interested in Coit Tower.

The media guidance application may add the object to the object exclusion list upon approval received from user input. Specifically, the media guidance application may add to the object exclusion list any of the objects selected as a result of the prompt. Continuing from the previous example, if the user selects that Coit Tower is to be put on the exclusion list, then this object will be added to the object exclusion list.

It should also be noted that the systems and/or methods described above may be applied to, or used in accordance with, other systems and/or methods.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
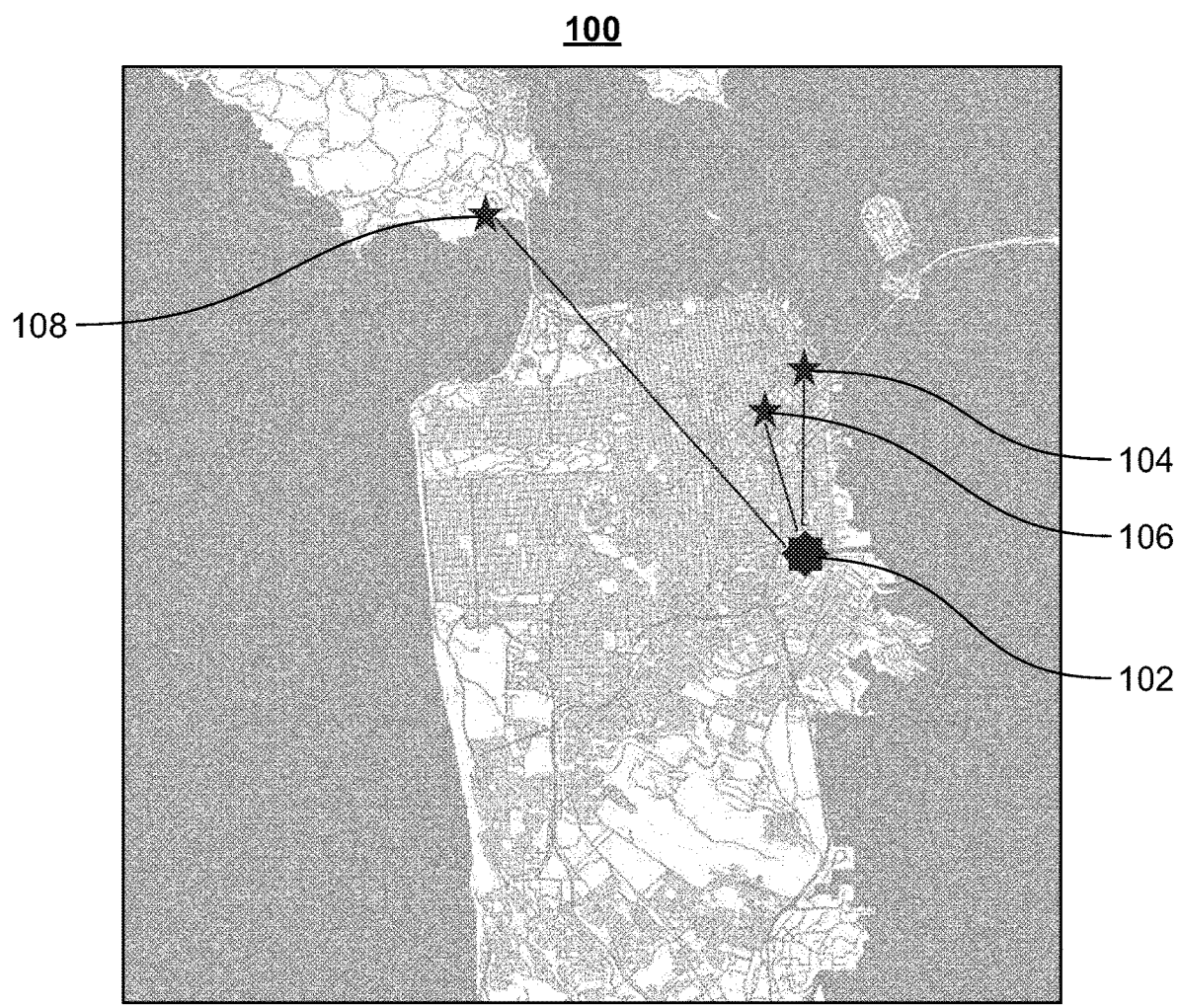
FIG. 1 shows an illustrative embodiment of a user's locational map for a current time period.
Figure 2:
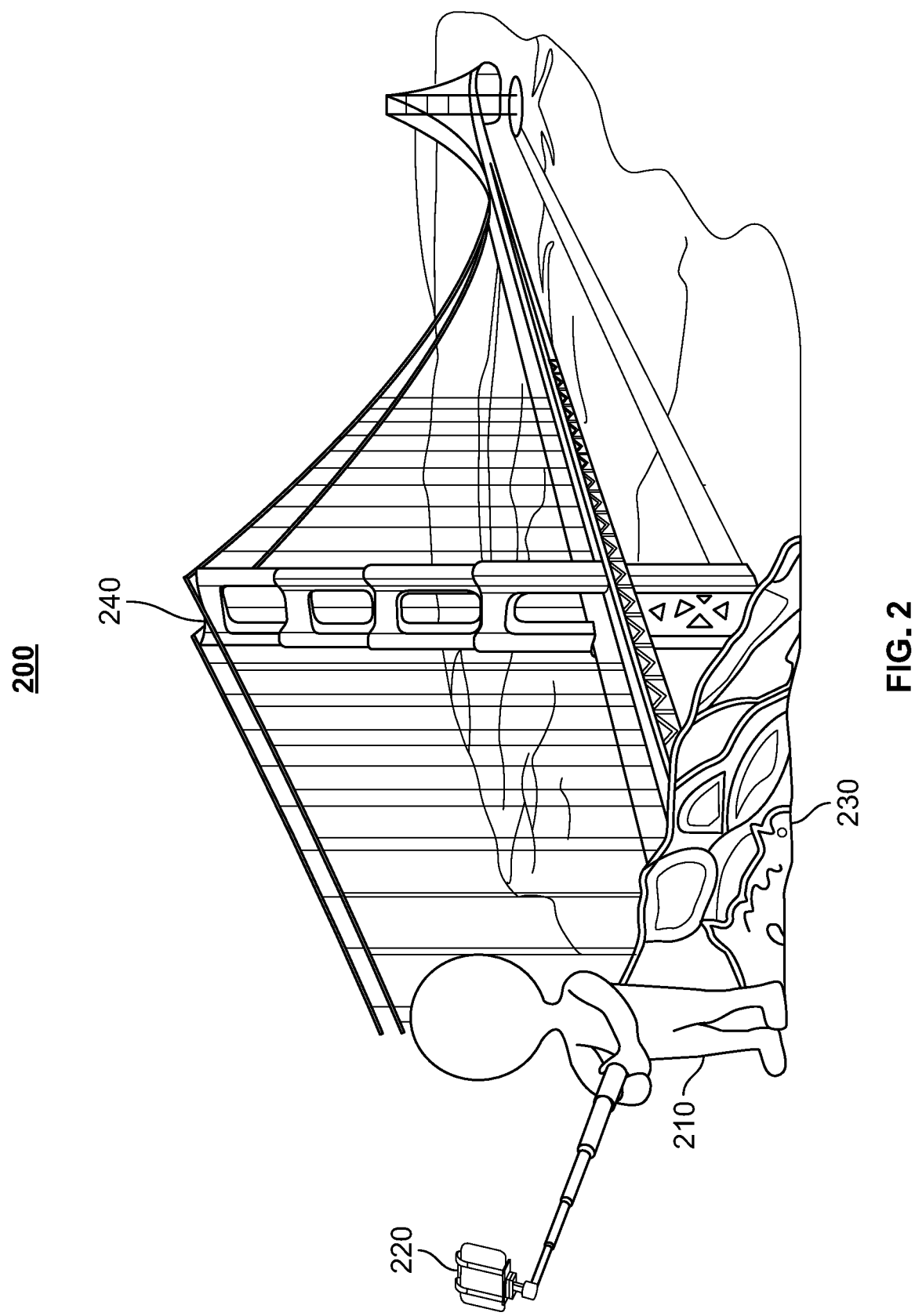
FIG. 2 shows an illustrative embodiment of a user capturing a visual asset using a user device at a location.

Systems and methods are described herein for training network-connected objects to provide configurations in association with events within media assets. In some embodiments, the media guidance application may perform the following actions to enable recommendation of media assets based on objects captured in visual assets. The media guidance application may receive pictures captured by a user's electronic device. Specifically, the media guidance application may retrieve a visual asset captured by a user device. In some embodiments, a visual asset is any type of visual entity including, but not limited to, pictures, videos, animations, manipulations of any of the preceding assets, and similar visual entities. In some embodiments, an object is any visually distinct pattern within a visual asset. For example, the media guidance application may determine a location associated with the visual asset, a user takes a picture of the Golden Gate Bridge from the Marin Headlands peak in Marin Country using their mobile phone having an embedded camera. The location of the user's travels can be seen in FIG. 1. FIG. 1 shows an illustrative embodiment of a user's locational map for a current time period. Specifically, a map of San Francisco 100 displays the user's residence in the Dogpatch neighborhood 102 of San Francisco, and the user's work in the Financial District neighborhood 104 and the local gym 106 the user attends nearby. The map also shows the Marin Headlands 108 across the Golden Gate Bridge located in Marin County. In the previous example, the user took a picture of the Golden Gate Bridge at the Marin Headlands (shown as 108 on the map). FIG. 2 shows an illustrative embodiment of a user capturing a visual asset using a user device at a location. Specifically, an illustration of a vantage point setting 200 at the Marin Headlands is shown, where the user 210 is taking a picture using their electronic device 220 (e.g., cellphone) of the Golden Gate Bridge 240.

The media guidance application may determine the location of the picture taken by the user's device. Specifically, the media guidance application may determine a location associated with the visual asset. In some embodiments, a location is any distinct set of coordinates relative to any other set of coordinates. Continuing with the previous example, the picture on the user's mobile phone may have embedded metadata which contains the Global Positioning System (GPS) coordinates of where the picture was taken.

The media guidance application may determine whether the location of the picture is deemed relevant by using a score. Specifically, the media guidance application may determine a location score for the location based on one or more (techniques) of: a user travel score associated with the location, a user frequency score associated with the location, and a popularity score associated with the location. In some embodiments, the determination using a weighting scheme which applies specific weights to a specific technique more than another technique used (e.g., double weight is applied to popularity relative to user frequency). In some embodiments, the determination is a product of a mathematical model implemented which is applied to each of the specific techniques used. In some embodiments, weighting is added based on the relative score disparity between each of the techniques (e.g., if travel distance is very large it may receive larger weighting, or conversely if all techniques have equal magnitudes, each technique will be weighted equally). Continuing with the previous example, the picture of the Golden Gate Bridge on the user's mobile phone taken from the location of the Marin Headlands will be scored based on at least one of a number of techniques based on a travel distance, travel frequency, or popularity of the location.

The media guidance application may determine a travel score by measuring the distances for a number of locations the user has visited. Specifically, the media guidance application may determine a user travel score associated with the location by retrieving a plurality of locations that the user has visited. Continuing with the previous example, the user ventured to the Marin Headlands and this location of the Marin Headlands may be retrieved by the media guidance application to evaluate the user travel score. Additionally, other locations the user has traveled, as shown in FIG. 1, may also be retrieved by the media guidance application (e.g., the user's work location 104, the user's local gym 106) as shown in FIG. 1.

The media guidance application may calculate the distances from the home location of the user to all the locations that the user has visited. Specifically, the media guidance application may calculate, for the plurality of locations, a plurality of distances each distance between the user's home location and the respective location that the user has visited. Continuing from the previous example, the media guidance application may calculate the distance from the user's home residence in Dogpatch to Marin Headlands (11 miles), the user's home residence to the user's work in the Financial District (3.5 miles), and the user's home residence to the user's gym (3.1 miles). The distances are visually depicted in FIG. 1 where it can be seen that Marin Headlands 108 is substantially farther than the Financial District 104/106 from the user's residence 102.

The media guidance application may determine a user travel radius based on the previous distance calculations. Specifically, the media guidance application may determine, based on the plurality of distances, a user travel radius. Continuing from the previous example, in this specific example, a travel radius may be determined by averaging all the distances resulting in a travel radius of approximately 5.8 miles.

The media guidance application may calculate the distance between the user's residence and the location where the user took the picture. Specifically, the media guidance application may calculate a travel distance between the user's home location and the location associated with the visual asset. Continuing from the previous example, the media guidance application calculates the distance between the user's residence in Dogpatch and the Marin Headlands where the user took the picture of the Golden Gate Bridge which is 11 miles.

The media guidance application may compare the distance between the user's residence and where the picture was taken with the travel radius value. Specifically, the media guidance application may compare the user travel radius with the travel distance. Continuing from the previous example, the user would compare the 11 miles value (distance between user's residence and Marin Headlands) to the travel radius of 5.8 miles.

The media guidance application may create a travel score based on the previous comparison. Specifically, the media guidance application may generate the user travel score for the location based on the difference in the user travel radius and the travel distance. Continuing from the previous example, the score may be a value of the ratio between the two numbers and the 1.89 weighing the distance from the user's residence to the Marin Headlands relative to the calculated user radius.

The media guidance application may determine a score based on the number of times the user visits a location. Specifically, the media guidance application may determine a user travel frequency score associated with the location by determining a number of times the user has visited the location during the current time period. Continuing from the previous example, the media guidance application may check how many times the user has visited the Marin Headlands. In this scenario, the user has never visited the Marin Headlands prior to taking the picture of the Golden Gate Bridge.

The media guidance application may check if the number of times the user has visited the location is more than a predetermined value. Specifically, the media guidance application may determine whether the number of times the user has visited the location during the current time period exceeds a number of times the user has visited the location during a previous time period, by a first given amount. Continuing from the previous example, the user's number of visits (e.g., 1) is compared to a previous time period (e.g., 0). Thus, in this case, the user's visit exceeds the number of visits the user had done previously.

The media guidance application may determine a frequency score based on the number of times the user has visited the location that they took the picture relative to the number of visits the user made to the same location at a different time period. Specifically, the media guidance application may in response to a determination that the number of times the user has visited the location during the current time period exceeds the number of times the user has visited the location during the previous time period, by the first given amount, calculate the user travel frequency score for the location based on a difference value by which the number of times the user visited the location for the current time period exceeded the number of times the user visited the location for the previous time period. Continuing from the previous example, the score may be 100 as the ratio between number of visits to the location relative to previous visits is (1:0).

Figure 3:
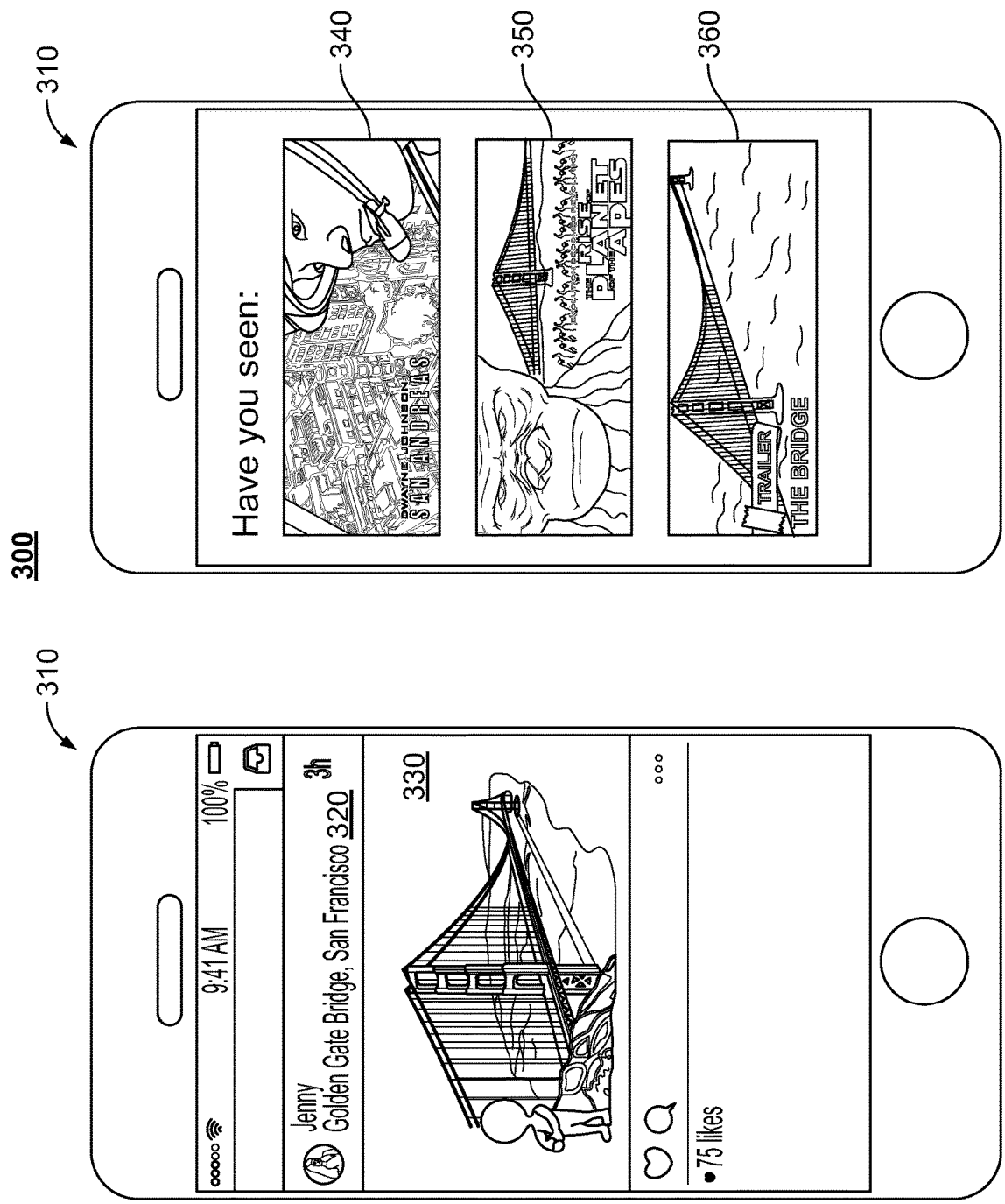
FIG. 3 shows a first illustrative embodiment of a visual asset on a social network with a locational identifier.

The media guidance application may determine how popular a location is based on the amount of social media asset that's generated for the location for a recent time period. Specifically, the media guidance application may determine a popularity score associated with the location determined by calculating an amount of metadata created in association with the location for the current time period. Continuing from the previous example, the media guidance application may determine that the user is at the Marin Headlands and may search an image based social media network to determine how many social media posts have been posted within the last 24 hours for the Marin Headlands. FIG. 3 shows an illustrative embodiment of a visual asset on a social network with a locational identifier. Specifically, the social network application 310 running a user device illustrates a picture 330 of the Golden Gate Bridge (e.g., visual asset) with a locational identifier 320 as "Golden Gate Bridge of San Francisco" posted by a user Jenny.

The media guidance application may generate a number of media asset recommendations based on the visual asset. For example, based on the locational identifier 320 as "Golden Gate Bridge of San Francisco" posted by a user Jenny, the media guidance application generates: San Andreas 340, Rise of the Planet of the Apes 350, and The Bridge 360 which all contain scenes of the Golden Gate Bridge and are set in San Francisco.

Figure 4:
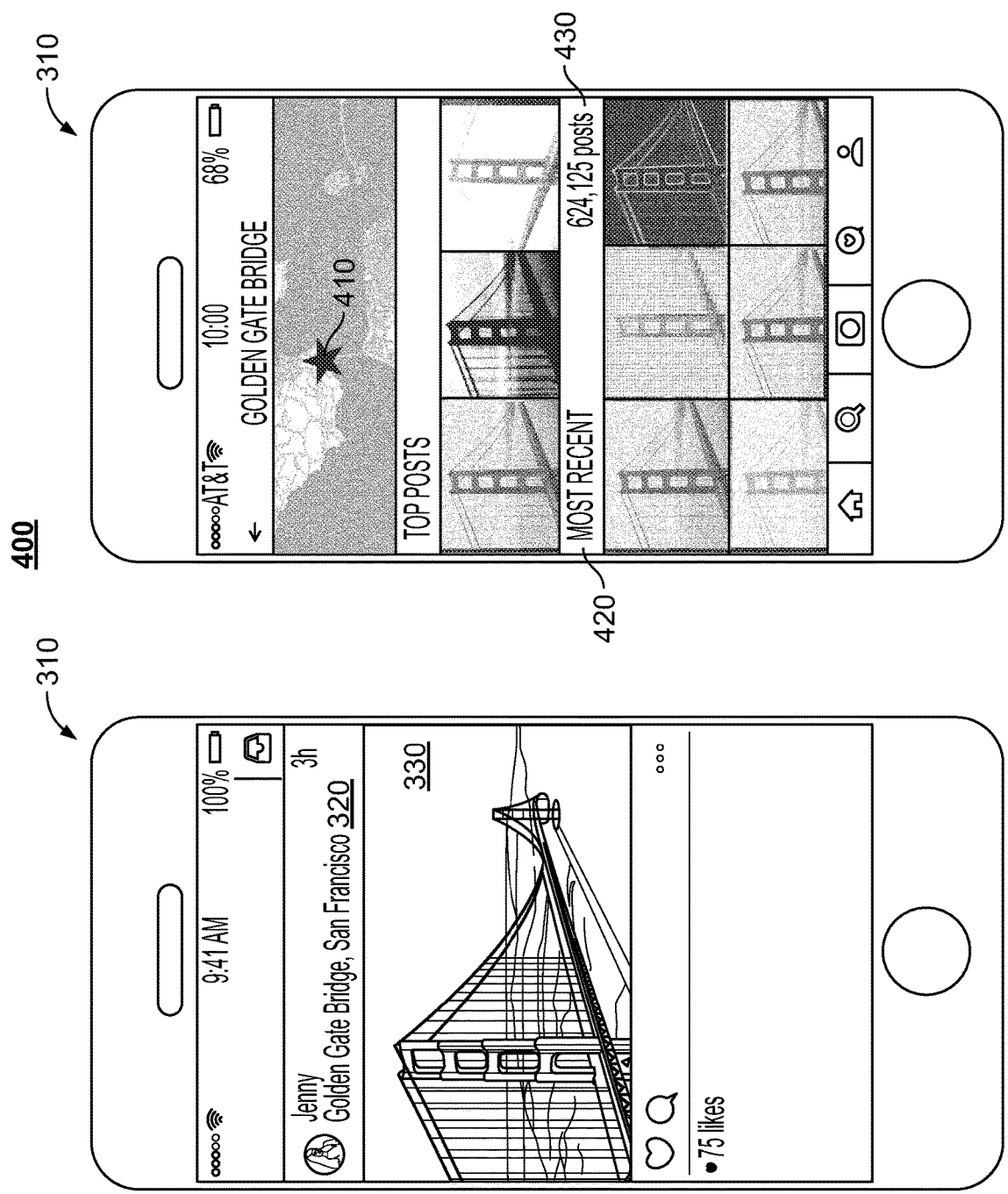
FIG. 4 shows a second illustrative embodiment of a visual asset on a social network with a locational identifier.

FIG. 4 shows yet another illustrative embodiment of a visual asset on a social network with a locational identifier 400. The media guidance application may track the social media network by comparing the amount of social media created for the location for a current time period to a previous time period. Specifically, the media guidance application may determine whether the amount of metadata created in association with the location for the current time period exceeds an amount of metadata created in association with the location for the previous time period by a second given amount. Continuing from the previous example, the media guidance application may determine that the amount of posts for the Marin Headlands in the last 24 hours exceeds the previous 5 days by a factor of at least four times more content relative to each of the past four days. Selecting the locational identifier 320 will bring a second screen which shows all posts in relation to this locational identifier showing the locational identifier on a map 410. Additionally, the number of posts are sorted by "Recent" 420 which indicates all posts within the last week. There are 624,125 posts created 430 using the locational identifier 320.

The media guidance application may create a score based on the difference between the amount of social network content created for the current period relative to a previous period. Specifically, the media guidance application may in response to a determination that the amount of metadata created in association with the location for the current time period exceeds the amount of metadata created in association with the location for the previous time period by the second given amount, calculate the popularity score for the location based on a popularity value by which the amount of metadata created in association with the location for the current time period exceeds the amount of metadata created in association with the location for the previous time period. Continuing from the previous example, the score may be "4" as the amount of posts for the Marin Headlands in the last 24 hours exceeds the previous 5 days by a factor of at least four times more content relative to each of the past four days.

The media guidance application may determine whether the location score (e.g., determined from at least one of the travel score, frequency score, and popularity score) is greater than a predetermined threshold value. Specifically, the media guidance application may determine whether the location score exceeds a threshold. Continuing from the previous example, the location score generated from at least one of the travel score, frequency score, and popularity score is compared to a predetermined value.

Figure 5:
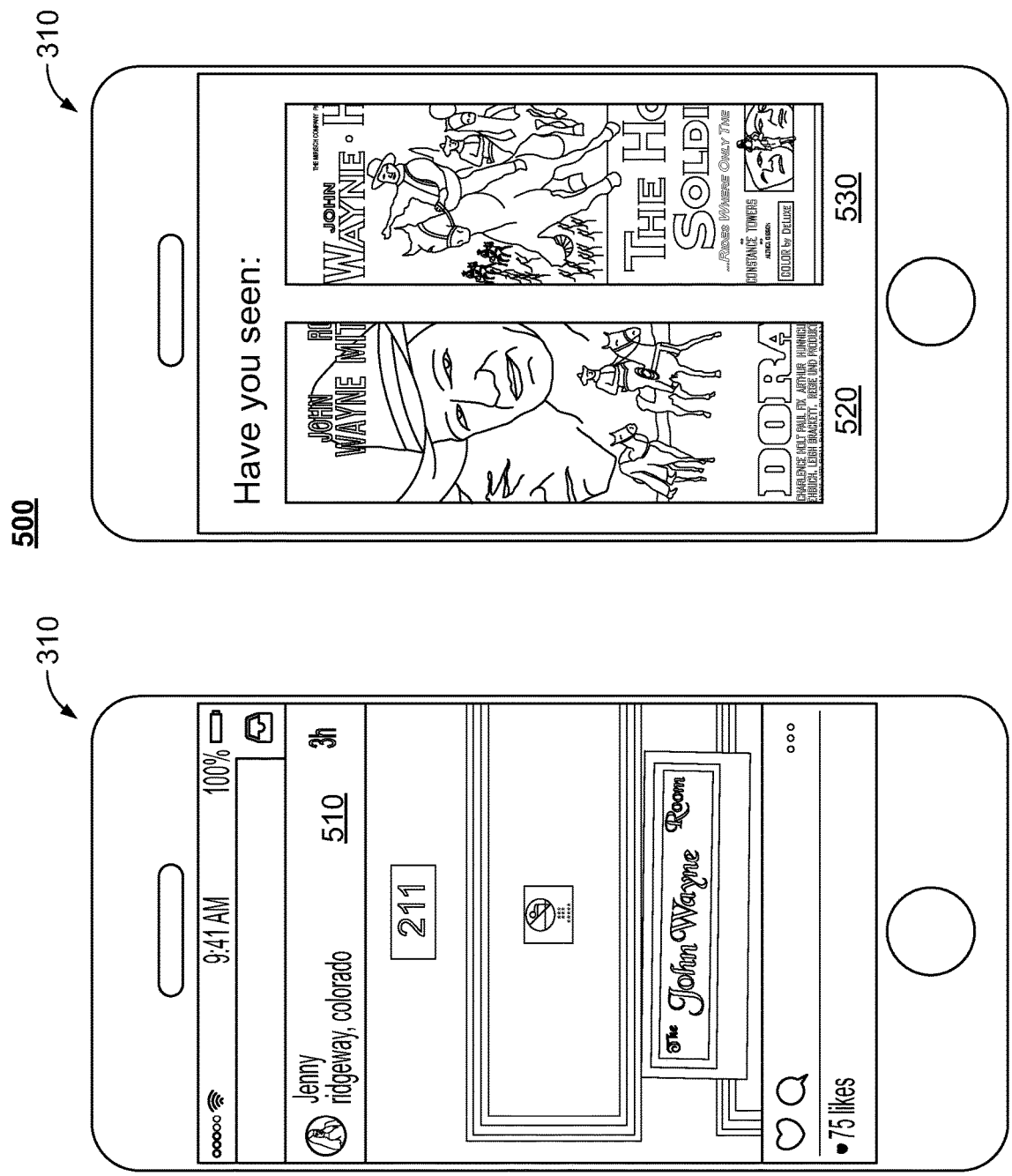
FIG. 5 shows a third illustrative embodiment of a visual asset on a social network with a locational identifier.

The media guidance application may detect an object within the picture taken from the user's device. Specifically, the media guidance application may in response to a determination that the location score exceeds the threshold, detect an object within the visual asset. In some embodiments, detecting an object may utilize one or more known techniques for object recognition including: edge detection, color pattern recognition, partial linear filtering, regression algorithms, and neural network pattern recognition. Continuing from the previous example, the picture taken by the user's mobile phone at the Marin Headlands is analyzed and is determined that the Golden Gate Bridge is an object within the picture taken. FIG. 5 is yet another example of illustrative embodiment of a visual asset on a social network with a locational identifier 500. Jenny has taken a picture in Ridgeway, Colo. which is reflected in the locational identifier 510 of a door. The door illustrates a door number "211", a "non-smoking sign" and "The John Wayne Room." The media guidance application may select an object within this visual asset based on a specific image detection technique. For example, the technique for object detection within the visual asset may be based on the user's metadata history with any of the detected objects, or based on user friend recommendation, or other user metadata. In this example, the media guidance application detects the object as "The John Wayne Room". The media guidance application generates media asset recommendations for the user based on this object within the visual asset and provides movies based on "John Wayne", including "El Dorado" 520 and "The Horse Soldiers" 530.

The media guidance application may provide media asset recommendations to the user based on the objects within the picture captured by the user. Specifically, the media guidance application may generate a recommendation of a media asset that is associated with the object. In some embodiments, additional factors may be included in generating recommendations of media assets to the user including, but not limited to, metadata relating to the user, media asset metadata (both aggregate and user specific), media company specific promotion information.

In some embodiments, the media guidance application may detect an object within the picture taken by the user. Specifically, the media guidance application may detect an object within the visual asset. Continuing from the previous example, the media guidance application detects that the Golden Gate Bridge is an object within the picture taken.

The media guidance application may compare the detected object to known objects (e.g., perhaps by comparison to a database). Specifically, the media guidance application may compare the object within the visual asset with each of a plurality of known objects. Continuing from the previous example, the Golden Gate Bridge is compared to the textual representation and/or visual representation of the Golden Gate Bridge to one or more databases which have known objects.

The media guidance application may determine a match based on the previous comparison of the determined object to known objects in the database. Specifically, the media guidance application may determine, based on comparing the object within the visual asset with each of the plurality of known objects, whether the object within the visual asset matches a known object within the plurality of known objects. Continuing from the previous example, the Golden Gate Bridge identified in the picture is confirmed a known object based on comparison to the database.

The media guidance application may retrieve the locational data associated with the known object as it matches the object in the picture taken by the user. Specifically, the media guidance application may in response to a determination that the object within the visual asset matches the known object within the plurality of known objects. Continuing from the previous example, the locational coordinates of the Golden Gate Bridge as retrieved from the database.

The media guidance application may assign the locational data from the known object to the object from the picture taken by the user. Specifically, the media guidance application may assign the locational coordinates to the visual asset. Continuing from the previous example, the Golden Gate Bridge will be assigned the locational coordinated of the known object from the database (which is also the Golden Gate Bridge as it matched earlier).

The media guidance application may obtain GPS coordinates of the picture taken by accessing the metadata of the picture. Specifically, the media guidance application may retrieve, from metadata associated with the visual asset, GPS coordinates for the visual asset. Continuing from the previous example, the GPS coordinates of the Golden Gate Bridge is obtained from the metadata of the picture from the user's mobile phone.

The media guidance application may compare the retrieved GPS coordinates with a number of other GPS coordinates. Specifically, the media guidance application may compare the GPS coordinates of the visual asset with a plurality of sets of GPS coordinates, wherein each set of GPS coordinates of the plurality of sets of coordinates is associated with a location. Continuing from the previous example, the GPS coordinates of the Golden Gate Bridge are compared to a number of other GPS coordinates.

The media guidance application may determine if the retrieved GPS coordinates match any of the number of other GPS coordinates. Specifically, the media guidance application may determine, based on comparing the GPS coordinates of the visual asset with the plurality of sets of GPS coordinates, whether the GPS coordinates of the visual asset match a set of the plurality of sets of the GPS coordinates. In some embodiments, matching GPS coordinates may constitute an exact match of values. In yet other embodiments, matching GPS coordinates may constitute a predetermined tolerance (e.g., a percentage tolerance, a percentage relative to a specific distance value, etc.). Continuing from the previous example, the media guidance application determines whether the GPS coordinates of the Golden Gate Bridge match a number of other GPS coordinates.

The media guidance application may retrieve a location identifier upon matching the GPS coordinates which matched the GPS coordinates of the picture taken by the user's device. Specifically, the media guidance application may in response to a determination that the GPS coordinates of the visual asset match the set of the plurality of sets of the GPS coordinates, retrieve a location identifier associated with the set of the plurality of sets of the GPS coordinates. Continuing from the previous example, a locational identifier (e.g., specific for a social network) may be retrieved from the matching set of GPS coordinates to the GPS coordinates of the Golden Gate Bridge. In this way, the locational identifier may be for the "Golden Gate Bridge" as it's represented on the specific social network.

The media guidance application may retrieve a locational identifier from the metadata within the picture taken by the user's mobile phone. Specifically, the media guidance application may retrieve a locational identifier of the visual asset from metadata associated with the visual asset. In some embodiments, the locational identifier may be a locational tag, a hashtag, a description in a social media post, or any similar implicit or express descriptor of the location. Continuing from the previous example, the user took a picture from the Marin Headlands and the media guidance application may retrieve the locational identifier of "Marin Headlands" from the locational metadata within the picture.

The media guidance application may use the locational identifier to search a social network for other content using this identifier. Specifically, the media guidance application may search a social network for the locational identifier of the visual asset. Continuing from the previous example, the media guidance application may search a social network using the identifier "Marin Headlands".

The media guidance application may use the locational identifier to determine the number of posts a social network that use the locational identifier. Specifically, the media guidance application may determine the number of content posts associated with the locational identifier on the social network for the current time period. Continuing from the previous example, the media guidance application may determine that there are 50,000 posts on the social network using the identifier "Marin Headlands".

The media guidance application may retrieve a locational identifier from the metadata within the picture taken by the user's mobile phone. Specifically, the media guidance application may retrieve a locational identifier of the visual asset from the metadata associated with the visual asset. Continuing from the previous example, the user took a picture from the Marin Headlands and the media guidance application may retrieve the locational identifier of "Marin Headlands" from the locational metadata within the picture The media guidance application may search the Internet using the locational identifier for content associated with the locational identifier. Specifically, the media guidance application may search the Internet, using the locational identifier, for data associated with the locational identifier. Continuing from the previous example, the media guidance application may search the Internet for "Marin Headlands" (e.g., in word, image, audio, or other relevant format).

The media guidance application may determine the amount of content created on the Internet using the locational identifier. Specifically, the media guidance application may determine the number of Internet locations associated with the locational identifier that have been created during the current time period. In some embodiments, an Internet location may be any data on the internet in relation to the locational identifier including, but not limited to, a website, blog, article, RSS feed, social networking post, social media post, RSS feed, cookie, or similar data. Continuing from the previous example, the media guidance application may determine that there are 30,000 pieces of content on the Internet for "Marin Headlands."

The media guidance application may retrieve a start and end date for a specific time period. Specifically, the media guidance application may retrieve a start date and an end date for the current time period. In some embodiments, the start date/end date/timestamp includes any variation of timestamp including hours/minutes/seconds, day, year, or a relative time measurement (e.g., yesterday, today, tomorrow), or a comparative time measurement (e.g., 1 day after my birthday). Continuing from the previous example, the media guidance application may retrieve a start date as the day before the picture as taken and the end date at the point the picture was taken.

The media guidance application may search the Internet website for the date of creation of the website based on the locational identifier. Specifically, the media guidance application may search a first Internet location for a creation timestamp. Continuing from the previous example, the media guidance application searches and finds a website associated with the locational identifier of "Marin Headlands" and finds a timestamp of 8 hours before the picture was taken.

The media guidance application may compare the Internet website creation date with the start and end date. Specifically, the media guidance application may compare the creation timestamp with the start date and the end date. Continuing from the previous example, the timestamp of the website was 8 hours before the picture was taken.

The media guidance application may create a list of websites which are created within the time period based on the locational identifier. Specifically, the media guidance application may in response to a determination that the creation timestamp is between the start date and the end date, add the first location to a list of locations that have been created during the current time period. Continuing from the previous example, this website is added to the list as it was created within 8 hours of the picture being taken at the Marin Headlands.

The media guidance application may, within the picture captured by the user's device, detect a number of objects. Specifically, the media guidance application may detect a plurality of objects within the visual asset. Continuing from the previous example, the picture taken of the Golden Gate Bridge may also capture Coit Tower in San Francisco.

The media guidance application may send a prompt notification to the user's device of all the objects detected in the picture taken. Specifically, the media guidance application may generate for display to the user an indication of each object of the plurality of objects with a prompt to select and object of interest. Continuing from the previous example, the user's mobile phone would receive a prompt notification which lists the Golden Gate Bridge and Coit Tower.

The media guidance application may receive a selection of objects on the user's device after the prompt is given. Specifically, the media guidance application may receive, from the user, a selection of an object of the plurality of objects. Continuing from the previous example, the user may select both Coit Tower and the Golden Gate Bridge as a selection from the prompt.

The media guidance application may, based on the selections made by the user, indicate that those objects are of interest to the user. Specifically, the media guidance application may mark the selected object as an object of interest. Continuing from the previous example, both Coit Tower and the Golden Gate Bridge are of interest to the user.

The media guidance application may search a user's mobile phone for preexisting pictures. Specifically, the media guidance application may search a user device for preexisting visual assets. Continuing from the previous example, the user's mobile phone may be searched for preexisting pictures.

The media guidance application may, within the preexisting picture, determine objects. Specifically, the media guidance application may detect objects within the preexisting visual assets. Continuing from the previous example, the media guidance application may determine, from user's previous photos, that there is a picture of Coit Tower.

The media guidance application may compare the objects within the picture taken to the objects from preexisting pictures. Specifically, the media guidance application may compare each of the plurality of objects with detected objects within the preexisting visual assets. In some embodiments, preexisting visual assets may include pictures, movies, text in relation to visual assets (e.g., pictures/movies), audio data in relation to visual assets (e.g., pictures/movies). Continuing from the previous example, the objects of the picture taken include the Golden Gate Bridge and Coit Tower, while an object from a preexisting picture includes Coit Tower.

The media guidance application may prevent any prompt or further action for objects which have been shot before based on the user's previous preexisting pictures. Specifically, the media guidance application may refrain from generating for display any indications for each of the plurality of objects that match any of the detected objects within the preexisting visual assets. In some embodiments, an indication refers to any delivery of information to the user device of the object. The indication may be a hyperlink, a notification, a prompt, a picture, an audio note, or any similar type of delivered information in relation to the object. Continuing from the previous example, because Coit Tower previously existed and currently exists in the captured photo, no indications for Coit Tower will be generated for the user, as this is likely not of interest given that the user has already seen/experienced this landmark.

The media guidance application may check whether a determined object matches an object that has been marked for exclusion. Specifically, the media guidance application may determine whether any objects of the detected plurality of objects match an object that has been marked for exclusion. Continuing from the previous example, if the object is Coit Tower, the media guidance application may check whether Coit Tower has been marked for exclusion. In this scenario, Coit Tower has not been marked for exclusion.

The media guidance application may, upon matching, stop generating indications of the object for the user. Specifically, the media guidance application may in response to a determination that one or more of the detected plurality of objects match an object marked for exclusion, refrain from generating for display any indications for each of the one or more of the detected plurality of objects. Continuing from the previous example, future indications for Coit Tower would be shown as detected objects.

The media guidance application may receive a user command to delete an old picture on their mobile device. Specifically, the media guidance application may receive a command to delete a preexisting visual asset. Continuing from the previous example, the user may receive a command to delete an old picture of Coit Tower.

The media guidance application may determine all the objects within the picture. Specifically, the media guidance application may determine one or more objects within the preexisting visual asset. Continuing from the previous example, the picture of Coit Tower may have other objects. However, in this specific example, Coit Tower is the only object in the photo as the rest of the photo is black sky.

The media guidance application may send a prompt notification to the user to confirm whether they wish to add these objects to an object exclusion list. Specifically, the media guidance application may generate or display a prompt to add the one or more objects within the preexisting visual asset to an object exclusion list. Continuing from the previous example, the user would get a prompt asking whether they wish to place Coit Tower on the object exclusion list, as the media guidance application may assume the user may not be interested in Coit Tower.

The media guidance application may add the object to the object exclusion list upon approval received from user input. Specifically, the media guidance application may add to the object exclusion list any of the objects selected as a result of the prompt. Continuing from the previous example, is the user selects that Coit Tower is to be put on the exclusion list, then this object will be added to the object exclusion list.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

In some embodiments, display screens may be used to provide media guidance data implemented on any suitable user equipment device or platform. In some embodiments, displays may be full screen displays or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media asset, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 6:
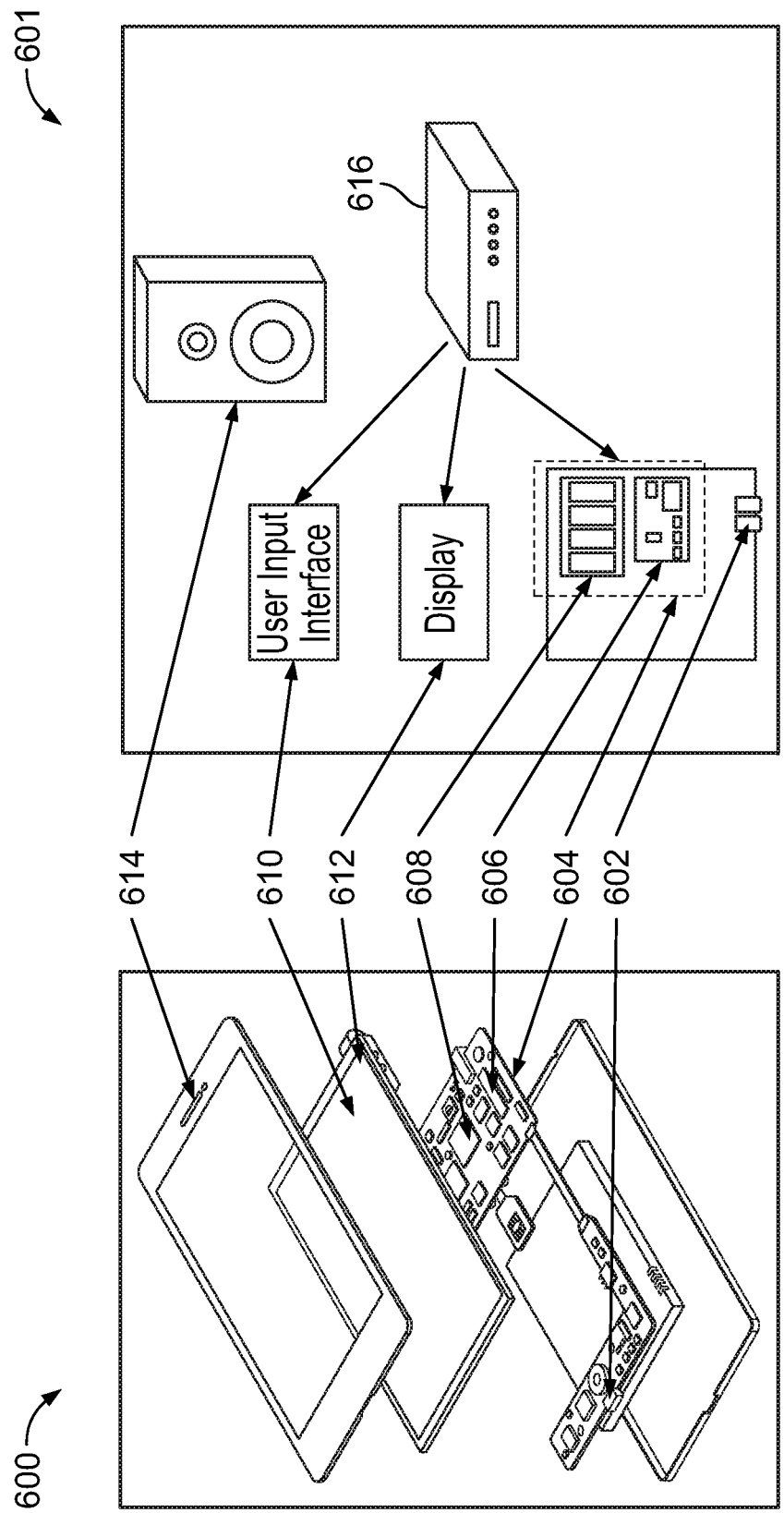
FIG. 6 is a block diagram of an illustrative user equipment (UE) device, in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D.

A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
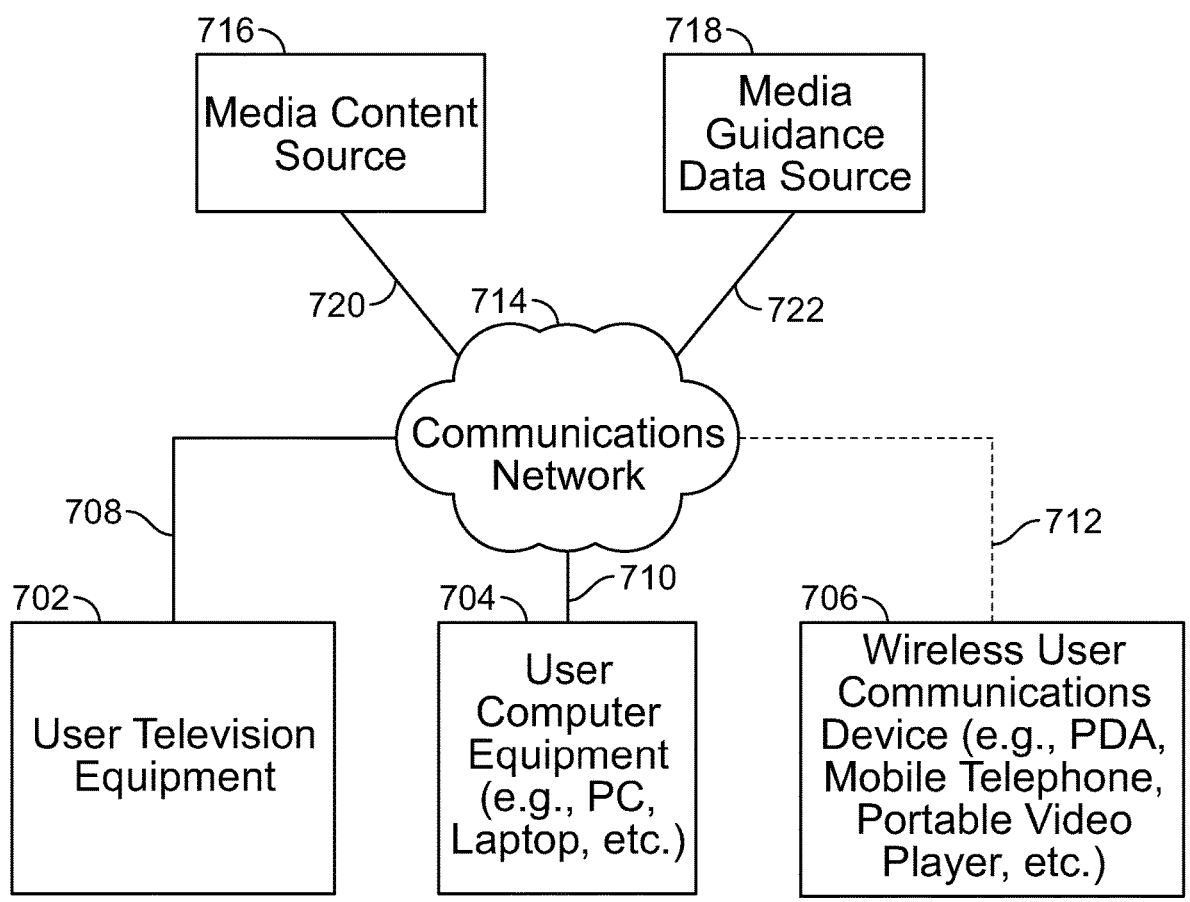
FIG. 7 is a block diagram of an illustrative media system, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
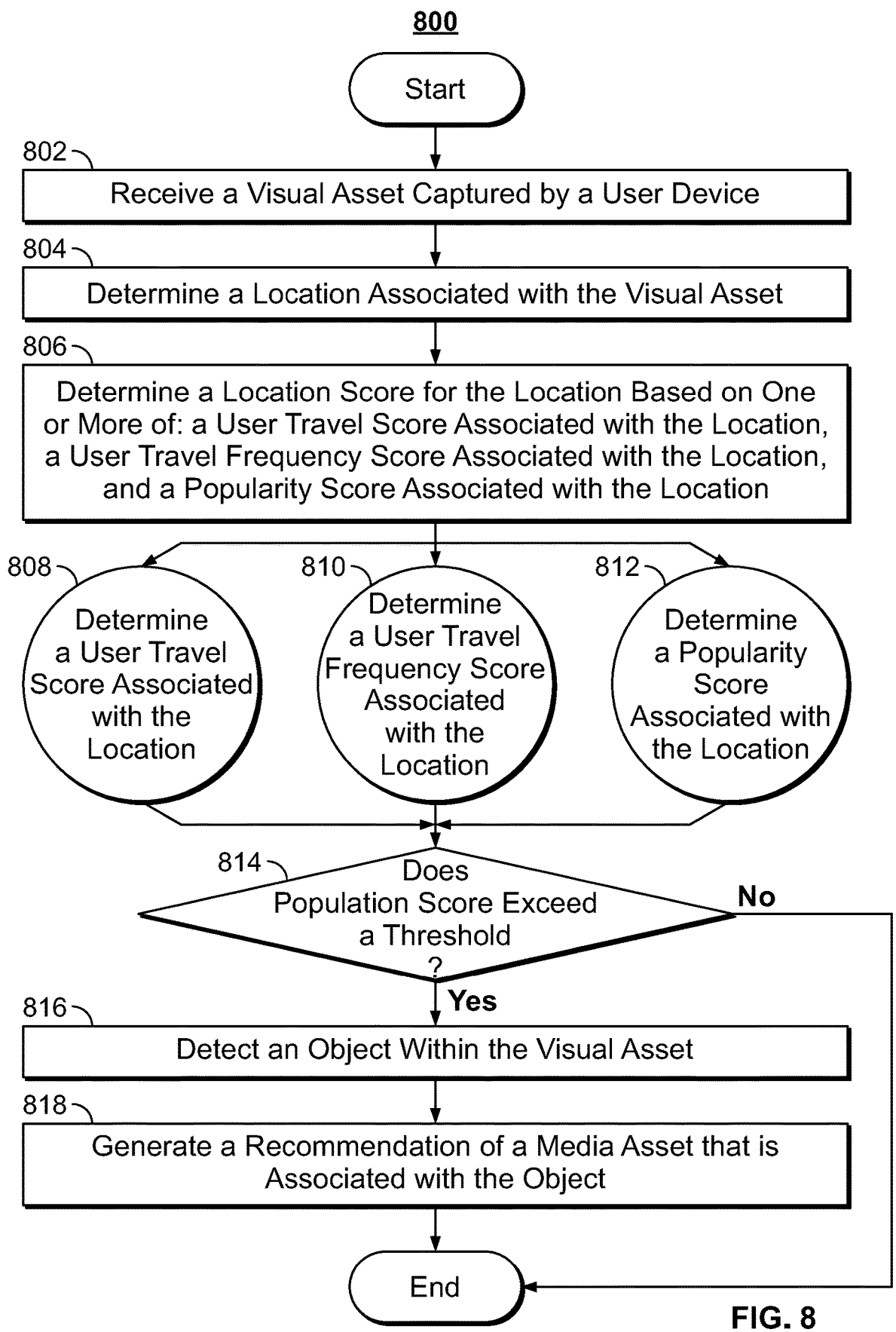
FIG. 8 is a flowchart of a process for recommending media assets based on objects captured in visual assets, in accordance with some embodiments of the disclosure.

FIG. 8 depicts an illustrative flowchart of a process 800 for recommending media assets based on objects captured in visual assets, in accordance with some embodiments of the disclosure. Process 800, and any of the following processes, may be executed by control circuitry 604 (e.g., in a manner instructed to control circuitry 604 by the media guidance application). Control circuitry 604 may be part of user equipment (e.g., user equipment 108, which may have any or all of the functionality of user television equipment 702, user computer equipment 704, and/or wireless communications device 506), or of a remote server separated from the user equipment by way of communication network 514, or distributed over a combination of both.

At 802, control circuitry 604 receives a visual asset captured by a user device (e.g., by user computer equipment 704 or wireless user communications device 706).

At 804, control circuitry 604 determines a location associated with the visual asset. In some embodiments, the location may be determined by user computer equipment 704. In some embodiments, the location may be determined by wireless user communications device 706. In some embodiments, the user computer equipment 704, through the media guidance application, may receive user input 610 specifying the location associated with the visual asset.

At 806, control circuitry 604 determines a location score for the location based on at least one of a user's travel score associated with the location, a user's travel frequency score, and a popularity score. In some embodiments, the determination of the location score may be determined by user computer equipment 704. In some embodiments, the determination of the location score may be determined by wireless user communications device 706.

At 808, control circuitry 604 determine a user travel score associated with the location. Further details of the determination of the user travel score can be found in the description of FIG. 9.

At 810, control circuitry 604 determine a user travel frequency score associated with the location. Further details of the determination of the user travel frequency score can be found in the description of FIG. 10.

At 812, control circuitry 604 determine a popularity score associated with the location. Further details of the determination of the popularity score can be found in the description of FIG. 11.

At 814, control circuitry 604 determines whether the location score exceeds a threshold. If, at 814, control circuitry determines "No," the location score is less than the threshold, and process continues to "End."

If, at 814, control circuitry 604 detects that "Yes," the location score is exceeded, the process advances to 816. At 816, control circuitry 604 detects an object within the visual asset.

At 818, control circuitry 604 generates a recommendation of a media asset that is associated with the object. In some embodiments, the generation of the recommendation receives information from user television equipment 702. In some embodiments, the generation of the recommendation receives information from media asset source 716. In some embodiments, the generation of the recommendation receives information from at least one of the user computer equipment 704 and wireless user communications device 706.

Figure 9:
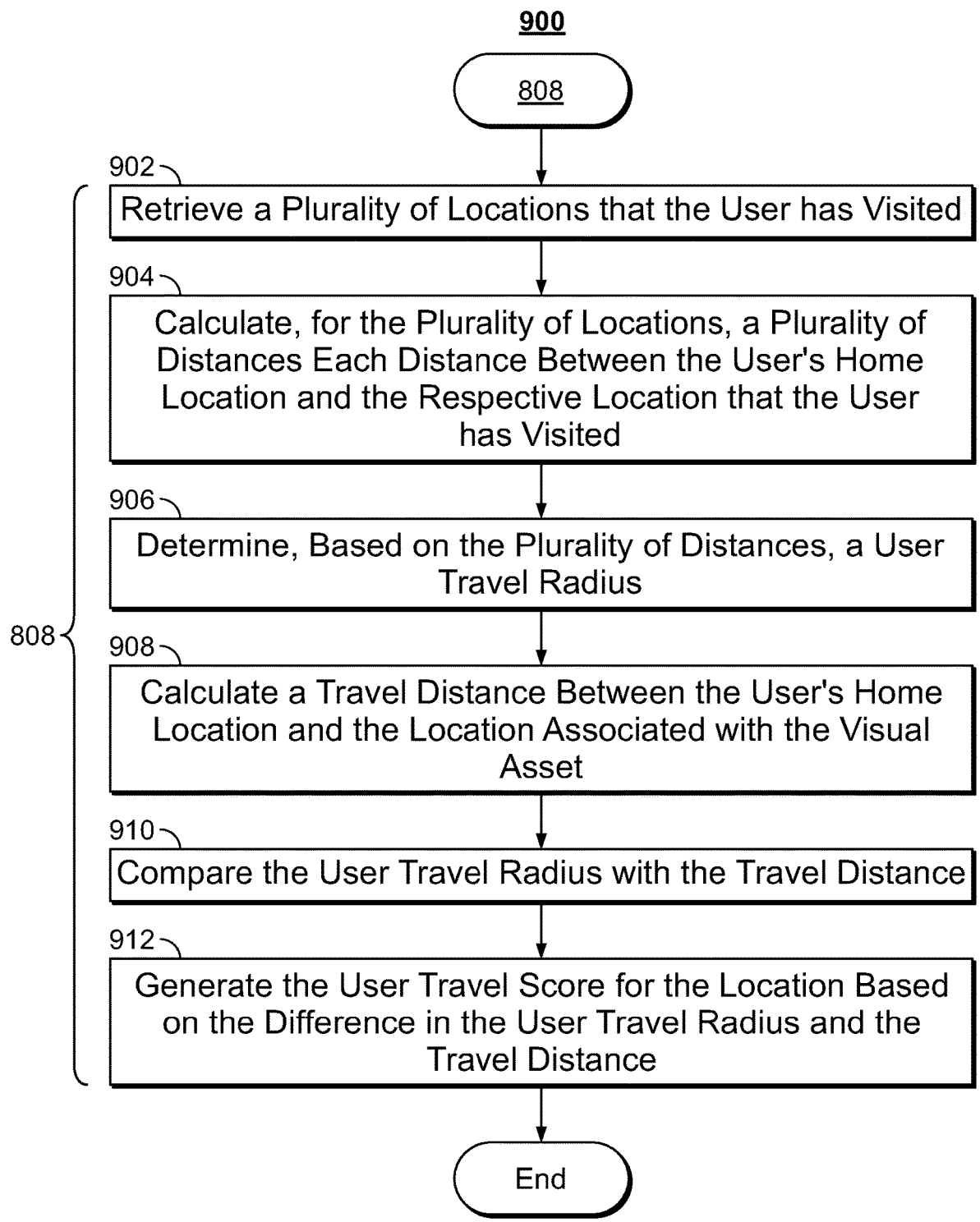
FIG. 9 is a flowchart of a process for determining a user travel score associated with the location, in accordance with some embodiments of the disclosure.

FIG. 9 depicts an illustrative flowchart of a process 900 for determining a user travel score associated with the location, in accordance with some embodiments of the disclosure. At 902, control circuitry 604 retrieves a plurality of locations that the user has visited. In some embodiments, the plurality of locations is retrieved, by the media guidance application, from at least one of the user computer equipment 704 and wireless user communications device 706.

At 904, control circuitry 604 calculates, for the plurality of locations, a plurality of distances each distance between the user's home location and the respective location that the user has visited. In some embodiments, the media guidance application receives user input from the user input interface 610 regarding distance between the user's home location and the respective location that the user has visited.

At 906, control circuitry 604 determines, based on the plurality of distances, a user travel radius. In some embodiments, the user travel radius is determined from at least one of the user computer equipment 704 and wireless user communications device 706 and received by the media guidance application.

At 908, control circuitry 604 calculates a travel distance between the user's home location and the location associated with the visual asset.

At 910, control circuitry 604 compares the user travel radius with the travel distance.

At 912, control circuitry 604 generates the user travel score for the location based on the difference in the user travel radius and the travel distance.

Figure 10:
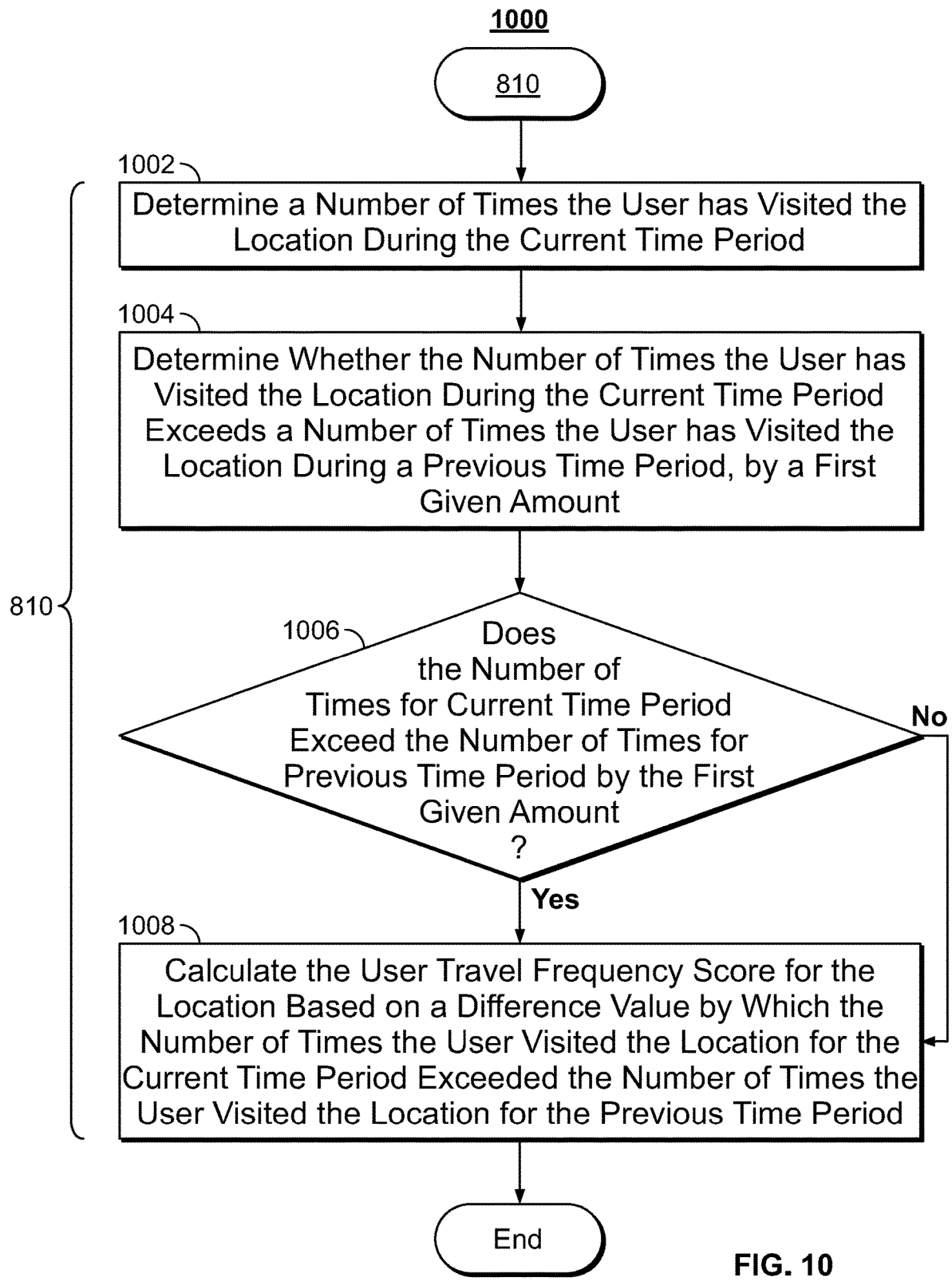
FIG. 10 is a flowchart of a process for determining a user travel frequency score associated with the location, in accordance with some embodiments of the disclosure.

FIG. 10 depicts an illustrative flowchart of a process 1000, for determining a user's travel frequency score associated with the location, in accordance with some embodiments of the disclosure. At 1002, control circuitry 604 determines a number of times the user has visited the location during the current time period. In some embodiments, the number of times the user has visited the location is determined from at least one of the user equipment 504 and wireless user communications device 706 and received by the media guidance application. In some embodiments, the media guidance application receives, through the user input interface 610, user input regarding the number of times the user has visited the location during the current time period.

At 1004, control circuitry 604 determines whether the number of times the user has visited the location during the current time period exceeds a number of times the user has visited the location during a previous time period, by a first given amount.

At 1006, control circuitry 604 determines, whether the number of times the user has visited the location during the current time period exceeds the number of times the user has visited the location during the previous time period, by the first given amount. If, at 1006, control circuitry determines "No," the number of times the user has visited the location during the current time period does not exceed the number of times the user has visited the location during the previous time period, by the first given amount, the process advances to 814.

If, at 1006, control circuitry 604 detects that "Yes," the number of times the user has visited the location during the current time period exceeds the number of times the user has visited the location during the previous time period, by the first given amount, the process advances to 1008. At 1008, control circuitry 604 calculates the user travel frequency score for the location based on the difference in value by which the number of times the user visited the location for the current time period exceeded the number of times the user visited the location for the previous time period.

Figure 11:
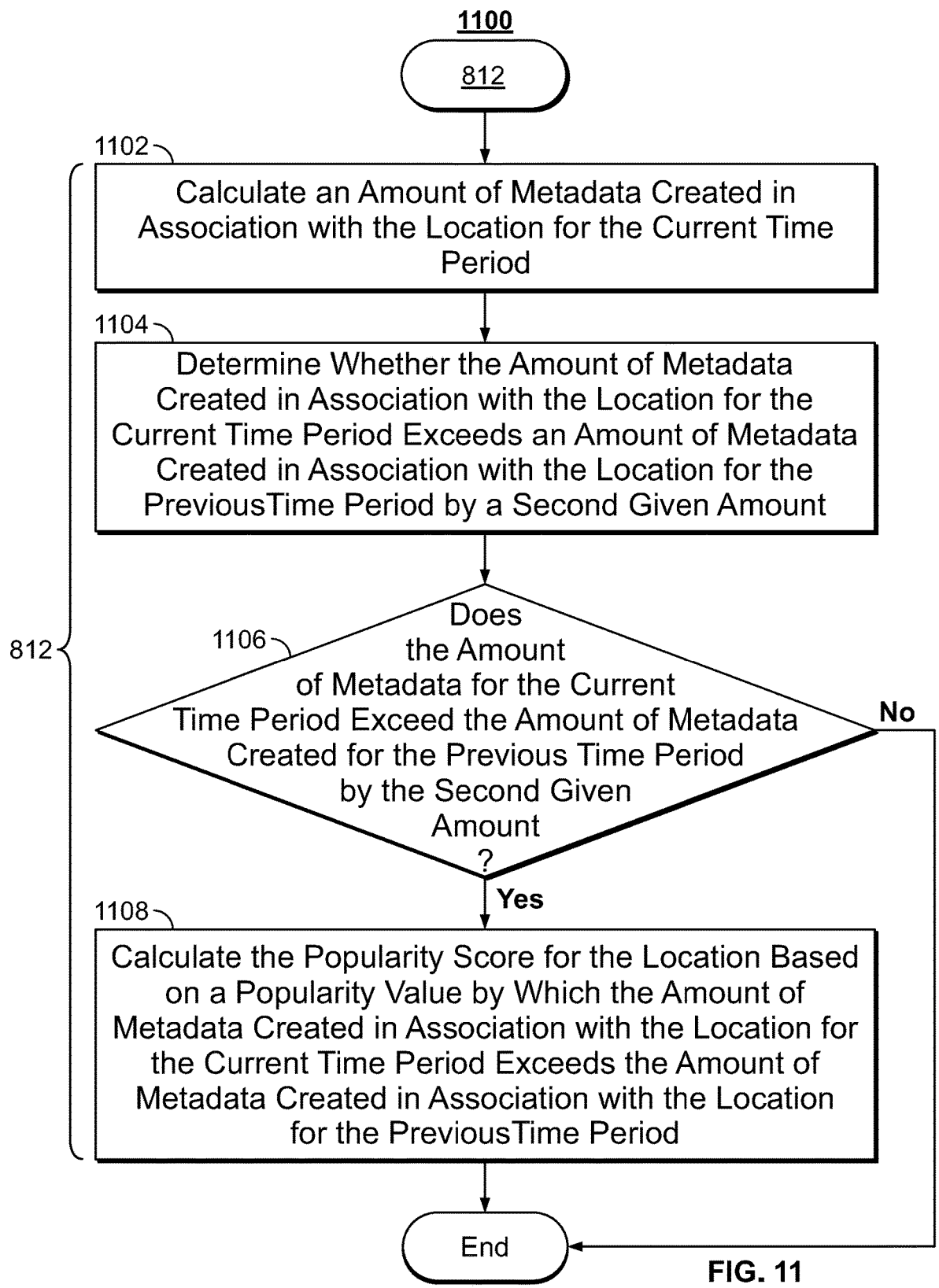
FIG. 11 is a flowchart for determining a popularity score associated with the location, in accordance with some embodiments of the disclosure.

FIG. 11 depicts an illustrative flowchart of a process 1100 for determining a popularity score associated with the location, in accordance with some embodiments of the disclosure. At 1102, control circuitry 604 calculates an amount of metadata created in association with the location for the current time period. In some embodiments, the media guidance application receives data from at least one of the media asset source 716 and the user television equipment 702, regarding the amount of metadata created in association with the location for the current time period.

At 1104, control circuitry 604 determines whether the amount of metadata created in association with the location for the current time period exceeds an amount of metadata created in association with the location for the previous time period by a second given amount. If, at 1106, control circuitry 604 determines "No," the amount of metadata created in association with the location for the current time period does not exceed the amount of metadata created in association with the location for the previous time period by the second given amount, the process advances to 814.

If, at 1106, control circuitry 604 detects that "Yes," the amount of metadata created in association with the location for the current time period exceeds the amount of metadata created in association with the location for the previous time period by the second given amount, the process advances to 1108. At 1108, control circuitry 604 calculates the popularity score for the location based on a popularity value by which the amount of metadata created in association with the location for the current time period exceeds the amount of metadata created in association with the location for the previous time period.

Figure 12:
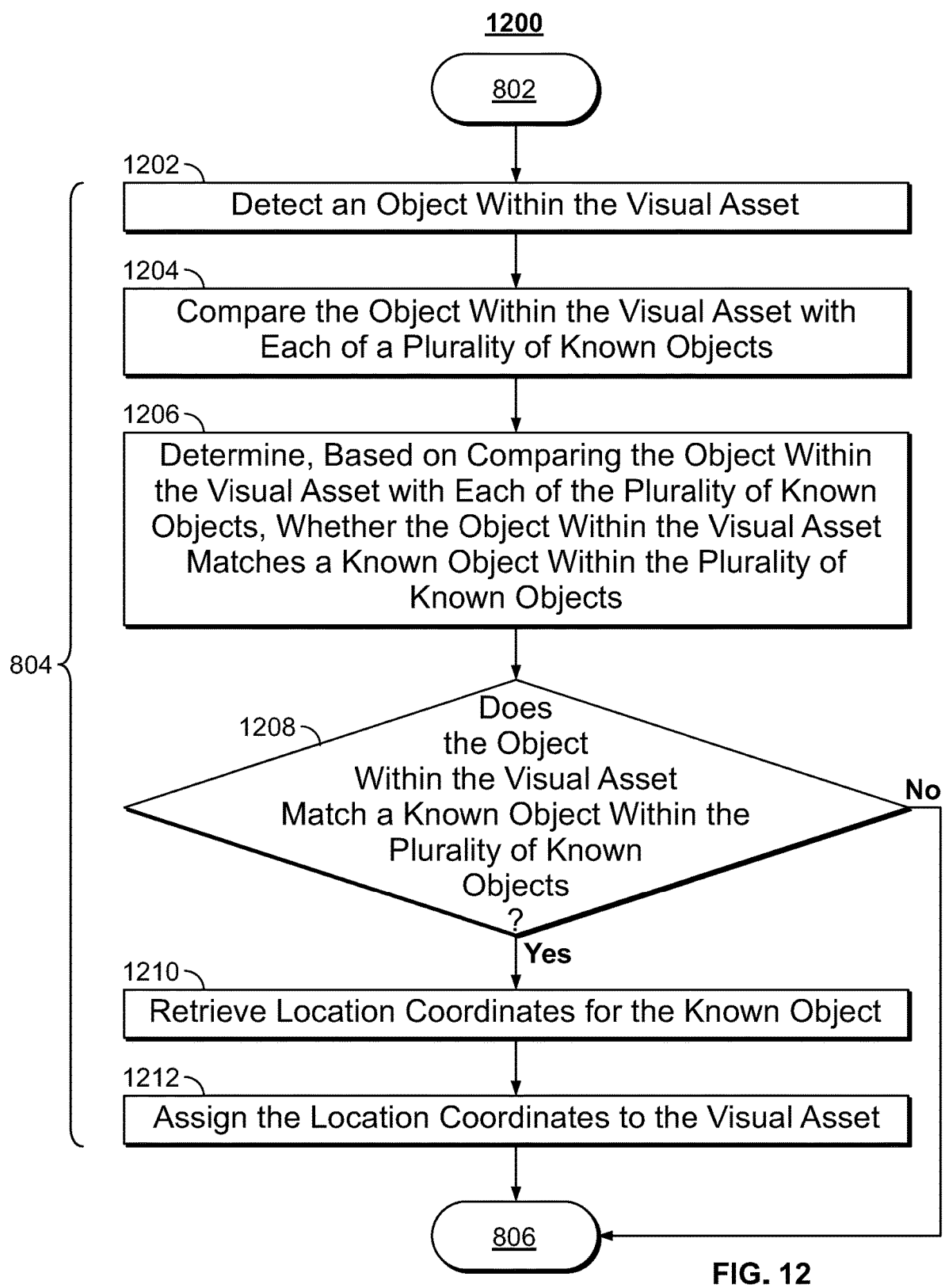
FIG. 12 is a flowchart of a process for determining a location associated with the visual asset, in accordance with some embodiments of the disclosure.

FIG. 12 depicts an illustrative flowchart of a process 1200 for determining the location associated with the visual asset, in accordance with some embodiments of the disclosure. At 1202, control circuitry 604 detects an object within the visual asset. In some embodiments, the object is detected by at least one of the user equipment 600 and wireless user communications device 706, and received by the media guidance application.

At 1204, control circuitry 604 compares the object within the visual asset with each of a plurality of known objects. In some embodiments, the plurality of known objects may be retrieved from at least one of a media asset source 716 and user television equipment 702.

At 1206, control circuitry 604 determines, based on comparing the object within the visual asset with each of the plurality of known objects, whether the object within the visual asset matches a known object within the plurality of known objects. If, at 1208, control circuitry 604 determines "No," the object within the visual asset does not match a known object within the plurality of known objects, the process continues to 806.

If, at 1208, control circuitry 604 detects that "Yes," the object within the visual asset matches a known object within the plurality of known objects, the process advances to 1210. At 1210, control circuitry 604 retrieves locational coordinates for the known object.

At 1212, control circuitry 604 assigns the locational coordinates to the visual asset.

Figure 13:
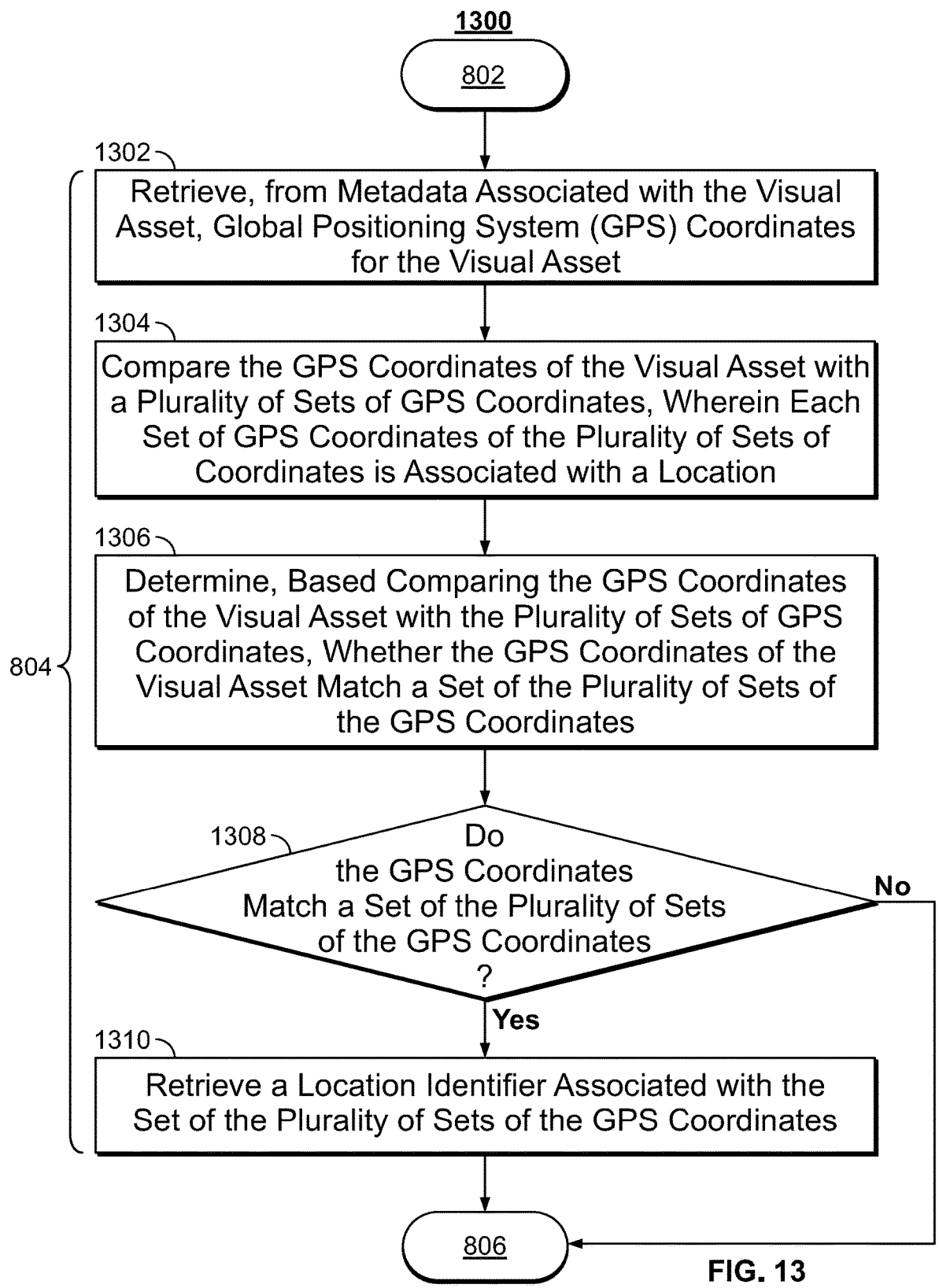
FIG. 13 is a flowchart of yet another process for determining a location associated with the visual asset, in accordance with some embodiments of the disclosure.

FIG. 13 depicts an illustrative flowchart of yet another process 1300 for determining a location associated with the visual asset, in accordance with some embodiments of the disclosure. At 1302, control circuitry 604 retrieve, from metadata associated with the visual asset, Global Positioning System (GPS) coordinates for the visual asset. In some embodiments, the GPS coordinates are retrieved from at least one of the user computer equipment 704 and wireless user communications device 706.

At 1304, control circuitry 604 compares the GPS coordinates of the visual asset with a plurality of sets of GPS coordinates. Each set of GPS coordinates of the plurality of sets of coordinates is associated with a location.

At 1306, control circuitry 604 determines, based on comparing the GPS coordinates of the visual asset with the plurality of sets of GPS coordinates, whether the GPS coordinates of the visual asset match a set of the plurality of sets of the GPS coordinates. If, at 1308, control circuitry 604 determines "No," the GPS coordinates of the visual asset do not match a set of the plurality of sets of the GPS coordinates, the process continues to 806.

If, at 1308, control circuitry 604 detects that "Yes," the GPS coordinates of the visual asset match a set of the plurality of sets of the GPS coordinates, the process advances to 1310. At 1310, control circuitry 604 retrieves a location identifier associated with the set of the plurality of sets of the GPS coordinates. In some embodiments, the location identifier is retrieved from at least one of the user television equipment 702 and media asset source 716.

Figure 14:
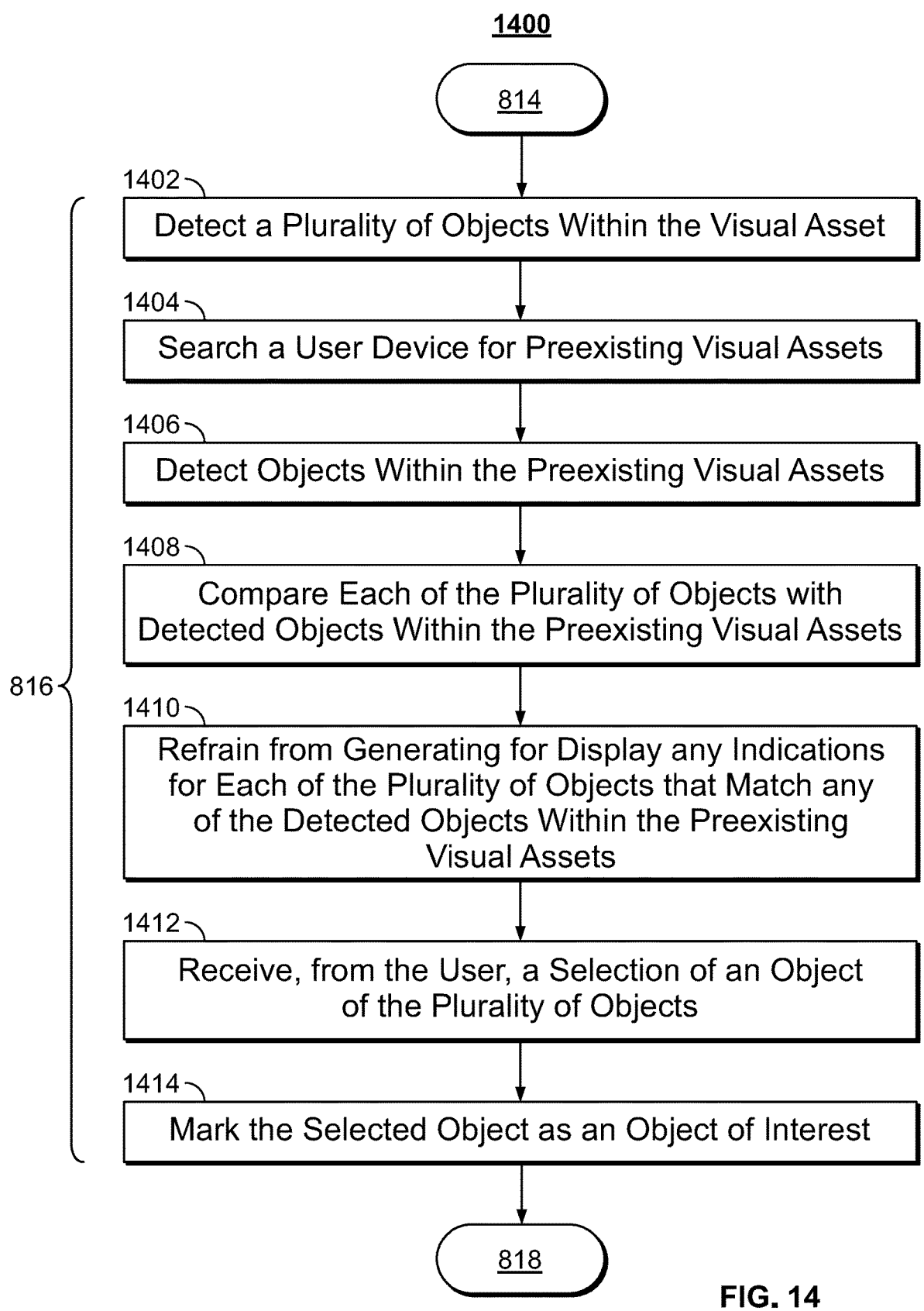
FIG. 14 is a flowchart of a process for detecting an object within the visual asset, in accordance with some embodiments of the disclosure.

FIG. 14 depicts an illustrative flowchart of a process 1400 for detecting an object within the visual asset, in accordance with some embodiments of the disclosure. At 1402, control circuitry 604 determines plurality of objects within the visual asset. In some embodiments, the plurality of objects is determined by at least one of the user computer equipment 704 and wireless user communications device 706.

At 1404, control circuitry 604 searches a user computer equipment 704 for preexisting visual assets.

At 1406, control circuitry 604 detects objects within the preexisting visual assets.

At 1408, control circuitry 604 compares each of the plurality of objects with detected objects within the preexisting visual assets.

At 1410, control circuitry 604 refrains from generating for display any indications for each of the plurality of objects that match any of the detected objects within the preexisting visual assets.

At 1412, control circuitry 604 receives, from the user, a selection of an object of the plurality of objects.

At 1414, control circuitry 604 marks the selected object as an object of interest.

Figure 15:
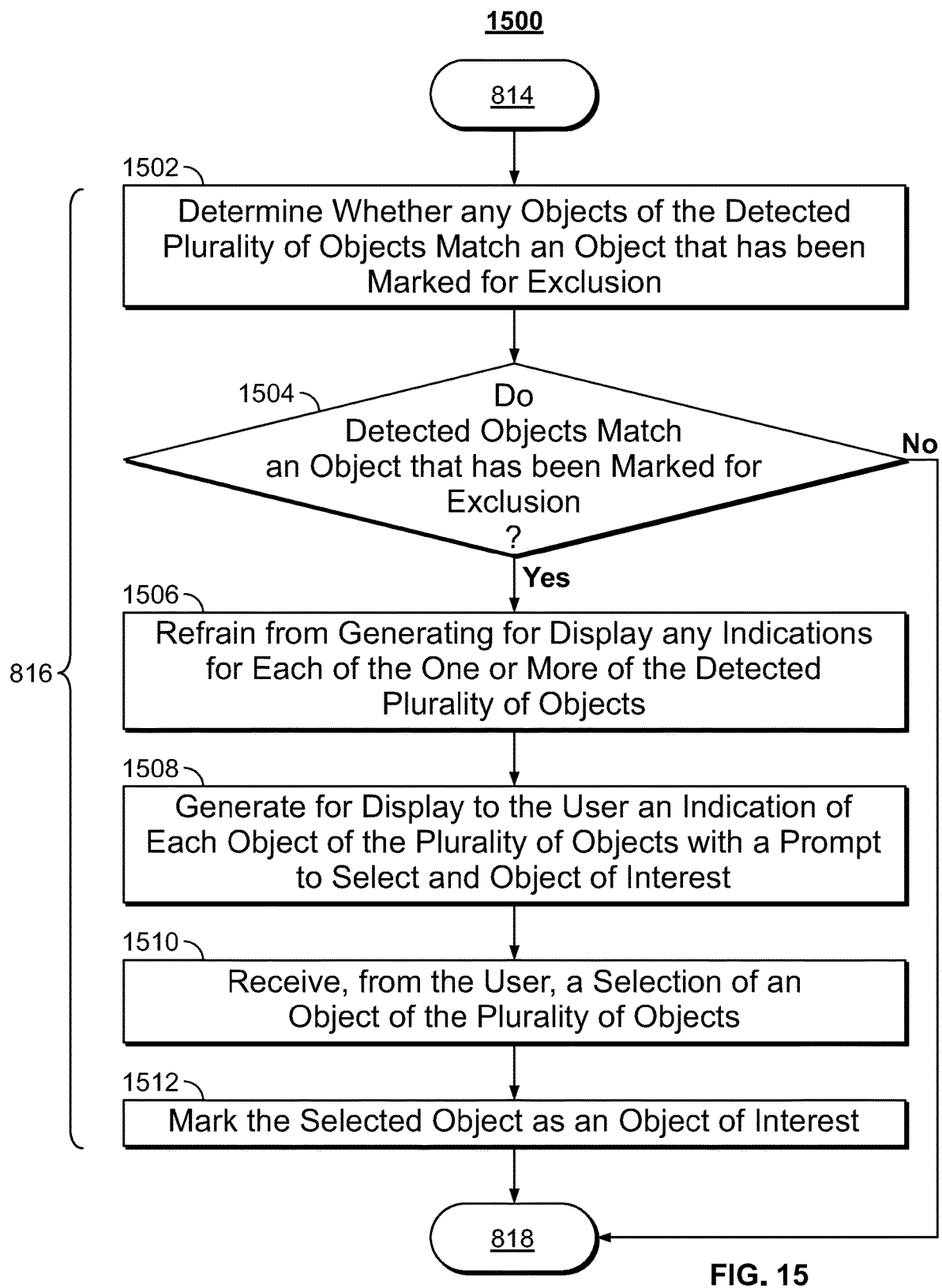
FIG. 15 is a flowchart of yet another process for detecting an object within the visual asset, in accordance with some embodiments of the disclosure.

FIG. 15 depicts an illustrative flowchart of yet another process 1500 for detecting an object within the visual asset, in accordance with some embodiments of the disclosure. At 1502, control circuitry 604 determines whether any objects of the detected plurality of objects match an object that has been marked for exclusion. If, at 1504, control circuitry 604 determines "No," the objects of the detected plurality of objects do not match an object that has been marked for exclusion, the process continues to 818.

If, at 1504, control circuitry 604 detects that "Yes," the objects of the detected plurality of objects match an object that has been marked for exclusion, the process advances to 1506. At 1506, control circuitry 604 refrains from generating for display any indications for each of the one or more of the detected plurality of objects.

At 1508, control circuitry 604 generates for display to the user an indication of each object of the plurality of objects with a prompt to select and object of interest.

At 1510, control circuitry 604 receives at the media guidance application, from the user by the user input interface 610, a selection of an object of the plurality of objects.

At 1512, control circuitry 604 marks the selected object as an object of interest.

Figure 16:
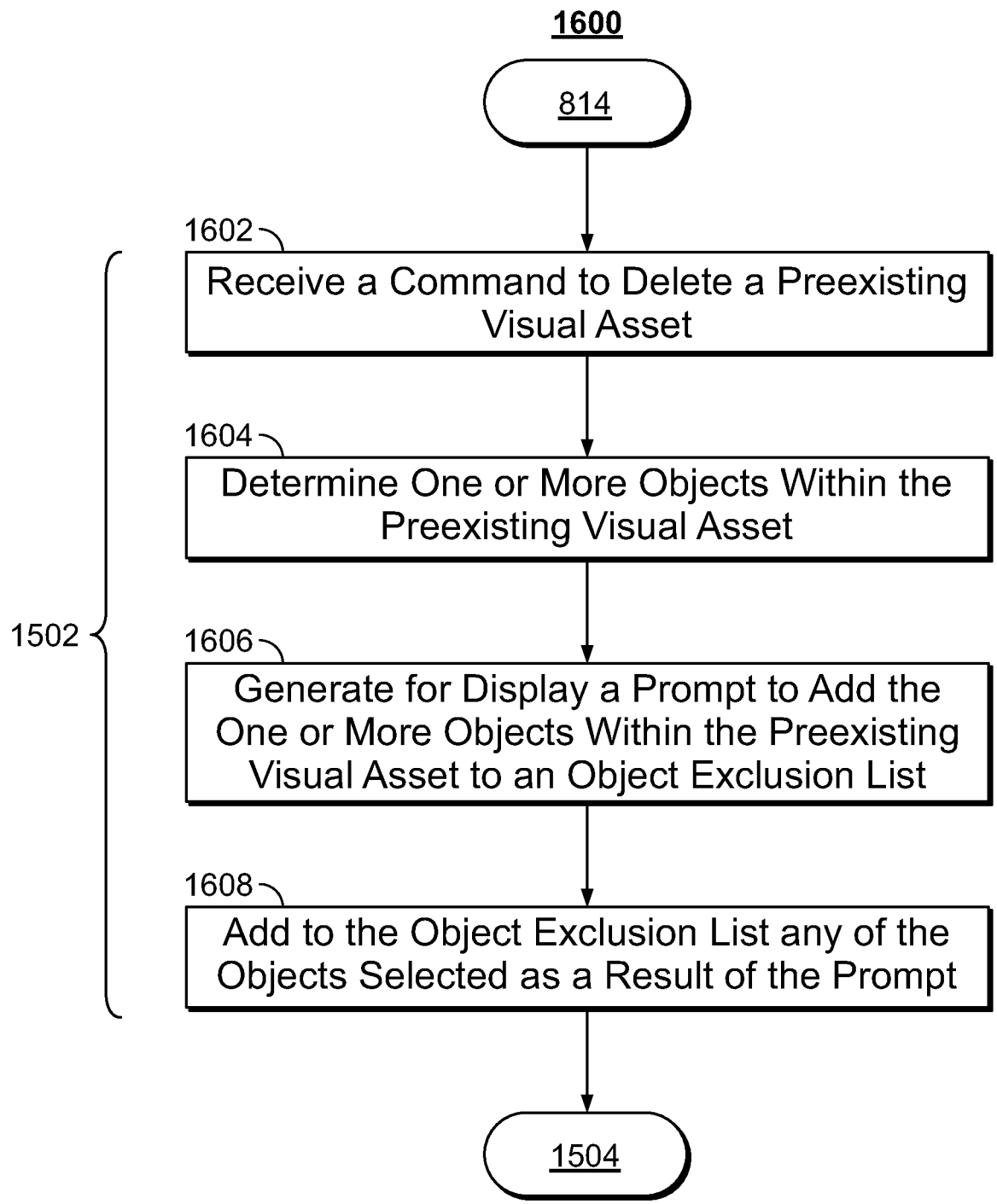
FIG. 16 is a flowchart of a process for detecting a plurality of objects within the visual asset, in accordance with some embodiments of the disclosure.

FIG. 16 depicts an illustrative flowchart of a process 1600 detecting a plurality of objects within the visual asset, in accordance with some embodiments of the disclosure. At 1602, control circuitry 604 receives a command to delete a preexisting visual asset. In some embodiments, the command to delete a preexisting visual asset is received from a user device from a user input interface 610.

At 1604, control circuitry 604 determines one or more objects within the preexisting visual asset.

At 1606, control circuitry 604 generates for display a prompt to add one or more objects within the preexisting visual asset to an object exclusion list.

At 1608, control circuitry 604 adds to the object exclusion list any of the objects selected as a result of the prompt.

Figure 17:
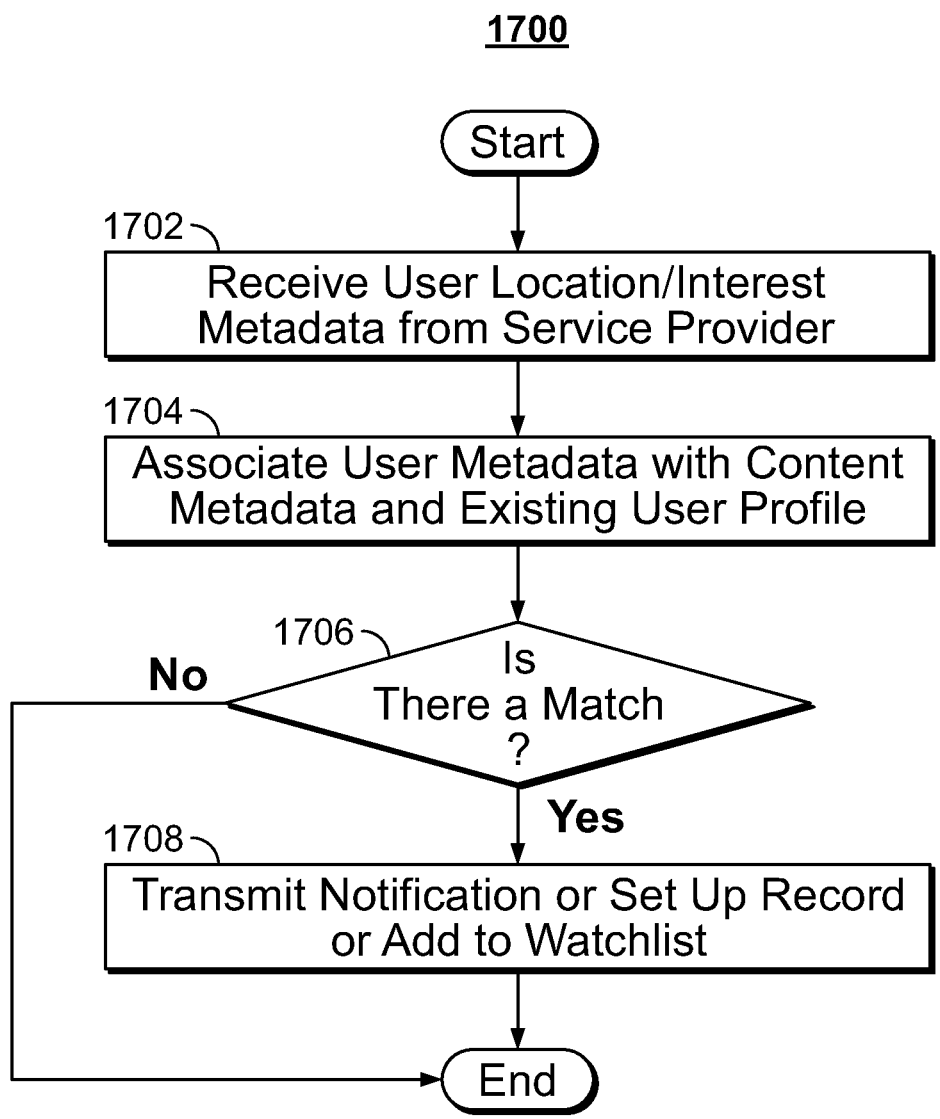
FIG. 17 is a flowchart of a process for associating locational user metadata with an existing user profile with some embodiments of the disclosure.

FIG. 17 depicts an illustrative flowchart of a process 1700 for associating locational user metadata with an existing user profile with some embodiments of the disclosure. At 1702, control circuitry 604 receives a user location/interest metadata from a service provider. In some embodiments, the location is received from a user input interface 610.

At 1704, control circuitry 604 associates the user location/interest metadata with content metadata and existing user profile. In some embodiments, the user profile is accessed from the media content source 716.

At 1706, control circuitry 604 determines, whether the user location/interest metadata matches a threshold similar with the content metadata and existing user profile. If, at 1706, control circuitry 604 determines "No," the user location/interest metadata does not match a threshold similar with the content metadata and existing user profile, the process advances to "End."

If, at 1706, control circuitry 604 detects that "Yes," the user location/interest metadata matches a threshold similarity with the content metadata and existing user profile, the process advances to 1708. At 1708, control circuitry 604 transmits a notification to the user device 704. In some embodiments, upon the user location/interest metadata matching a threshold similarity with the content metadata and existing user profile, the process sets up a record for future user association. In some embodiments, the user location/interest metadata matching a threshold similarity with the content metadata and existing user profile, the user location is matched with the existing user profile and added as metadata to a user watchlist for potential matching (or specific media assets matching the location are added to the watchlist).

It should be noted that processes 800-1700 or any step thereof could be performed on, or provided by, any of the devices shown in FIGS. 6-7. For example, any of processes 800-1700 may be executed by control circuitry 604 (FIG. 6) as instructed by control circuitry implemented on user equipment 502, 504, 506 (FIG. 5), and/or a user equipment device for selecting a recommendation. In addition, one or more steps of processes 800-1700 may be incorporated into or combined with one or more steps of any other process or embodiment.

It is contemplated that the steps or descriptions of each of FIGS. 8-17 may be used with any other embodiment of this disclosure. In addition, the steps and descriptions described in relation to FIGS. 8-17 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5, and 6-7 could be used to perform one or more of the steps in FIGS. 8-17.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 600, media asset source 716, or media guidance data source 718. For example, a profile, as described herein, may be stored in, and retrieved from, storage 608 of FIG. 6, or media guidance data source 718 of FIG. 7. Furthermore, processing circuitry, or a computer program, may update settings of user equipment 100 stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "related art" or "convention," any such reference is merely for the purpose of providing context to the invention(s) of the instant disclosure, and does not form any admission as to what constitutes the state of the art.

What is claimed is:

1. A method for recommending media assets based on objects captured in visual assets, the method comprising:
   receiving a visual asset captured by a user device;
   determining a location associated with the visual asset;
   determining a location score for the location based on one or more of:
   a user travel score associated with the location determined by:
      retrieving a plurality of locations that the user has visited;
      calculating, for the plurality of locations, a plurality of distances each distance between the user's home location and the respective location that the user has visited;
      determining, based on the plurality of distances, a user travel radius;
      calculating a travel distance between the user's home location and the location associated with the visual asset;
      comparing the user travel radius with the travel distance; and
      generating the user travel score for the location based on the difference in the user travel radius and the travel distance;
   a user travel frequency score associated with the location determined by:
      determining a number of times the user has visited the location during the current time period;
      determining whether the number of times the user has visited the location during the current time period exceeds a number of times the user has visited the location during a previous time period, by a first given amount; and
      in response to determining that the number of times the user has visited the location during the current time period exceeds the number of times the user has visited the location during the previous time period, by the first given amount, calculating the user travel frequency score for the location based on a difference value by which the number of times the user visited the location for the current time period exceeded the number of times the user visited the location for the previous time period;
   a popularity score associated with the location determined by:
      calculating an amount of metadata created in association with the location for the current time period;
      determining whether the amount of metadata created in association with the location for the current time period exceeds an amount of metadata created in association with the location for the previous time period by a second given amount; and
      in response to determining that the amount of metadata created in association with the location for the current time period exceeds the amount of metadata created in associated with the location for the previous time period by the second given amount, calculating the popularity score for the location based on a popularity value by which the amount of metadata created in association with the location for the current time period exceeds the amount of metadata created in association with the location for the previous time period;
   determining whether the location score exceeds a threshold; and
   in response to determining the location score exceeds the threshold:
      detecting an object within the visual asset; and
      generating a recommendation of a media asset that is associated with the object.

2. The method of claim 1, wherein determining the location associated with the visual asset comprises:

detecting an object within the visual asset;
comparing the object within the visual asset with each of a plurality of known objects;
determining, based on comparing the object within the visual asset with each of the plurality of known objects, whether the object within the visual asset matches a known object within the plurality of known objects;
in response to a determining that the object within the visual asset matches the known object within the plurality of known objects:
retrieving locational coordinates for the known object; and
assigning the locational coordinates to the visual asset.

3. The method of claim 1, wherein determining the location associated with the visual asset comprises:
retrieving, from metadata associated with the visual asset, Global Positioning System (GPS) coordinates for the visual asset;
comparing the GPS coordinates of the visual asset with a plurality of sets of GPS coordinates, wherein each set of GPS coordinates of the plurality of sets of coordinates is associated with a location;
determining, based comparing the GPS coordinates of the visual asset with the plurality of sets of GPS coordinates, whether the GPS coordinates of the visual asset match a set of the plurality of sets of the GPS coordinates; and
in response to a determination that the GPS coordinates of the visual asset match the set of the plurality of sets of the GPS coordinates, retrieving a location identifier associated with the set of the plurality of sets of the GPS coordinates.

4. The method of claim 1, wherein calculating the amount of metadata created in association with the location for the current time period comprises:
retrieving a locational identifier of the visual asset from metadata associated with the visual asset;
searching a social network for the locational identifier of the visual asset; and
determining the number of content posts associated with the locational identifier on the social network for the current time period.

5. The method of claim 1, wherein calculating the amount of metadata created in association with the location for the current time period comprises:
retrieving a locational identifier of the visual asset from metadata associated with the visual asset;
searching the Internet, using the locational identifier, for data associated with the locational identifier; and
determining the number of Internet locations associated with the locational identifier that have been created during the current time period.

6. The method of claim 1, wherein determining the number of Internet locations associated with the locational identifier that have been created during the current time period comprises:
retrieving a start date and an end date for the current time period;
searching a first Internet location for a creation timestamp;
comparing the creation timestamp with the start date and the end date; and
in response to determining that the creation timestamp is between the start date and the end date, adding the first location to a list of locations that have been created during the current time period.

7. The method of claim 1, wherein detecting an object within the visual asset comprises:
detecting a plurality of objects within the visual asset;
generating for display to the user an indication of each object of the plurality of objects with a prompt to select and object of interest;
receiving, from the user, a selection of an object of the plurality of objects; and
marking the selected object as an object of interest.

8. The method of claim 7, wherein generating for display to the user an indication of each object of the plurality of objects with a prompt to select and object of interest comprises:
searching a user device for preexisting visual assets;
detecting objects within the preexisting visual assets;
comparing each of the plurality of objects with detected objects within the preexisting visual assets; and
refraining from generating for display any indications for each of the plurality of objects that match any of the detected objects within the preexisting visual assets.

9. The method of claim 7, wherein detecting the plurality of objects within the visual asset comprises:
determining whether any objects of the detected plurality of objects match an object that has been marked for exclusion; and
in response to a determination that one or more of the detected plurality of objects match an object marked for exclusion, refraining from generating for display any indications for each of the one or more of the detected plurality of objects.

10. The method of claim 9, further comprising:
receiving a command to delete a preexisting visual asset;
determining one or more objects within the preexisting visual asset;
generating for display a prompt to add the one or more objects within the preexisting visual asset to an object exclusion list; and
adding to the object exclusion list any of the objects selected as a result of the prompt.

11. A system for recommending media assets based on objects captured in visual assets, comprising:
user input circuitry; and
control circuitry configured to:
receive a visual asset captured by a user device;
determine a location associated with the visual asset;
determine a location score for the location based on one or more of:
a user travel score associated with the location determined by:
retrieve a plurality of locations that the user has visited;
calculate, for the plurality of locations, a plurality of distances each distance between the user's home location and the respective location that the user has visited;
determine, based on the plurality of distances, a user travel radius;
calculate a travel distance between the user's home location and the location associated with the visual asset;
compare the user travel radius with the travel distance; and
generate the user travel score for the location based on the difference in the user travel radius and the travel distance;
a user travel frequency score associated with the location determined by:

determine a number of times the user has visited the location during the current time period;

determine whether the number of times the user has visited the location during the current time period exceeds a number of times the user has visited the location during a previous time period, by a first given amount; and in response to determining that the number of times the user has visited the location during the current time period exceeds the number of times the user has visited the location during the previous time period, by the first given amount, calculate the user travel frequency score for the location based on a difference value by which the number of times the user visited the location for the current time period exceeded the number of times the user visited the location for the previous time period;

a popularity score associated with the location determined by:

calculate an amount of metadata created in association with the location for the current time period;

determine whether the amount of metadata created in association with the location for the current time period exceeds an amount of metadata created in association with the location for the previous time period by a second given amount; and in response to determining that the amount of metadata created in association with the location for the current time period exceeds the amount of metadata created in associated with the location for the previous time period by the second given amount, calculate the popularity score for the location based on a popularity value by which the amount of metadata created in association with the location for the current time period exceeds the amount of metadata created in association with the location for the previous time period;

determine whether the location score exceeds a threshold; and in response to determining the location score exceeds the threshold:

detect an object within the visual asset; and generate a recommendation of a media asset that is associated with the object.

12. The system of claim 11, wherein the control circuitry is further configured, when determining the location associated with the visual asset, to:

detect an object within the visual asset;

retrieve location information from the metadata of the visual asset; and compare the object within the visual asset with each of a plurality of known objects;

determine, based on comparing the object within the visual asset with each of the plurality of known objects, whether the object within the visual asset matches a known object within the plurality of known objects;

in response to a determining that the object within the visual asset matches the known object within the plurality of known objects:

retrieve locational coordinates for the known object; and assign the locational coordinates to the visual asset.

13. The system of claim 11, wherein the control circuitry is further configured, when determining the location associated with the visual asset, to:

retrieve, from metadata associated with the visual asset, Global Positioning System (GPS) coordinates for the visual asset;

compare the GPS coordinates of the visual asset with a plurality of sets of GPS coordinates, wherein each set of GPS coordinates of the plurality of sets of coordinates is associated with a location;

determine, based comparing the GPS coordinates of the visual asset with the plurality of sets of GPS coordinates, whether the GPS coordinates of the visual asset match a set of the plurality of sets of the GPS coordinates; and in response to a determination that the GPS coordinates of the visual asset match the set of the plurality of sets of the GPS coordinates, retrieve a location identifier associated with the set of the plurality of sets of the GPS coordinates.

14. The system of claim 11, wherein the control circuitry is further configured, when calculating the amount of metadata created in association with the location for the current time period, to:

retrieve a locational identifier of the visual asset from metadata associated with the visual asset;

search a social network for the locational identifier of the visual asset; and determine the number of content posts associated with the locational identifier on the social network for the current time period.

15. The system of claim 11, wherein the control circuitry is further configured, when calculating the amount of metadata created in association with the location for the current time period, to:

retrieve a locational identifier of the visual asset from metadata associated with the visual asset;

search the Internet, using the locational identifier, for data associated with the locational identifier; and determine the number of Internet locations associated with the locational identifier that have been created during the current time period.

16. The system of claim 11, wherein the control circuitry is further configured, when determining the number of Internet locations associated with the locational identifier that have been created during the current time period, to:

retrieve a start date and an end date for the current time period;

search a first Internet location for a creation timestamp;

compare the creation timestamp with the start date and the end date; and in response to determining that the creation timestamp is between the start date and the end date, add the first location to a list of locations that have been created during the current time period.

17. The system of claim 11, wherein the control circuitry is further configured, when detecting an object within the visual asset further, to:

detect a plurality of objects within the visual asset;

generating for display to the user an indication of each object of the plurality of objects with a prompt to select and object of interest;

receive, from the user, a selection of an object of the plurality of objects; and mark the selected object as an object of interest.

18. The system of claim 17, wherein the control circuitry is further configured, when generating for display to the user an indication of each object of the plurality of objects with a prompt to select and object of interest, to:
  search a user device for preexisting visual assets;
  detect objects within the preexisting visual assets;
  compare each of the plurality of objects with detected objects within the preexisting visual assets; and
  refraining from generating for display any indications for each of the plurality of objects that match any of the detected objects within the preexisting visual assets.

19. The system of claim 17, wherein the control circuitry is further configured, when detecting an object within the visual asset further, to:
  determine whether any objects of the detected plurality of objects match an object that has been marked for exclusion; and
  in response to a determination that one or more of the detected plurality of objects match an object marked for exclusion, refrain from generating for display any indications for each of the one or more of the detected plurality of objects.

20. The system of claim 19, wherein the control circuitry is further configured to:
  receive a command to delete a preexisting visual asset;
  determine one or more objects within the preexisting visual asset;
  generate for display a prompt to add the one or more objects within the preexisting visual asset to an object exclusion list; and
  add to the object exclusion list any of the objects selected as a result of the prompt.

* * * * *